United States Patent [19]

Pettersen

[11] Patent Number: 5,196,900
[45] Date of Patent: Mar. 23, 1993

[54] METHOD AND SENSOR FOR OPTO-ELECTRONIC ANGLE MEASUREMENTS

[75] Inventor: Alf Pettersen, Gjettum, Norway
[73] Assignee: Metronor A.S., Nesbru, Norway
[21] Appl. No.: 582,936
[22] PCT Filed: Apr. 12, 1989
[86] PCT No.: PCT/NO89/00030
    § 371 Date: Oct. 9, 1990
    § 102(e) Date: Oct. 9, 1990
[87] PCT Pub. No.: WO89/09922
    PCT Pub. Date: Oct. 19, 1989

[30] Foreign Application Priority Data

Apr. 12, 1988 [NO] Norway .............................. 881579
Sep. 30, 1988 [NO] Norway .............................. 884337

[51] Int. Cl.$^5$ ...................... G01B 11/26; G01B 11/24; G01C 1/00
[52] U.S. Cl. .......................................... 356/141; 356/1; 356/152; 356/375; 356/376
[58] Field of Search .................. 356/141, 152, 1, 5, 356/375, 376

[56] References Cited

U.S. PATENT DOCUMENTS

| | | | |
|---|---|---|---|
| 4,315,689 | 2/1982 | Goda | 356/141 |
| 4,634,272 | 1/1987 | Endo | 356/152 |
| 4,710,028 | 12/1987 | Grenier et al. | 356/375 |
| 4,740,681 | 4/1988 | Tsuno | 356/152 |
| 4,881,809 | 11/1989 | Thierry | 356/152 |
| 5,000,564 | 3/1991 | Ake | 356/152 |

FOREIGN PATENT DOCUMENTS 3145823 4/1984 Fed. Rep. of Germany .

OTHER PUBLICATIONS

Machida et al., "High-efficiency fiber grating for producing multiple beams of uniform intensity", Applied Optics, vol. 23, No. 2, Jan. 15, 1984.

*Primary Examiner*—Stephen C. Buczinski
*Attorney, Agent, or Firm*—Cushman, Darby & Cushman

[57] ABSTRACT

A camera comprising a lens forms images onto a two-dimensional array of photo-sensitive elements, e.g. a CCD or CID sensor. The lens has a well defined center of rotational symmetry, giving an unambiguous definition of spatial directions. Such cameras form angle sensors to measure spatial directions towards light point sources or reflecting points illuminated by active light sources. The angle sensor is accurately calibrated using a high precision angle reference. The angle sensors are applied in various system configurations for spatial position and geometry measurements, including a system configured for simultaneous measurements of the three-dimensional coordinates of a plurality of points on a surface. That system comprises a subsystem for projection of multiple point sized light spots onto a surface, and a minimum of two angle sensors.

15 Claims, 17 Drawing Sheets

FIG. 4d1
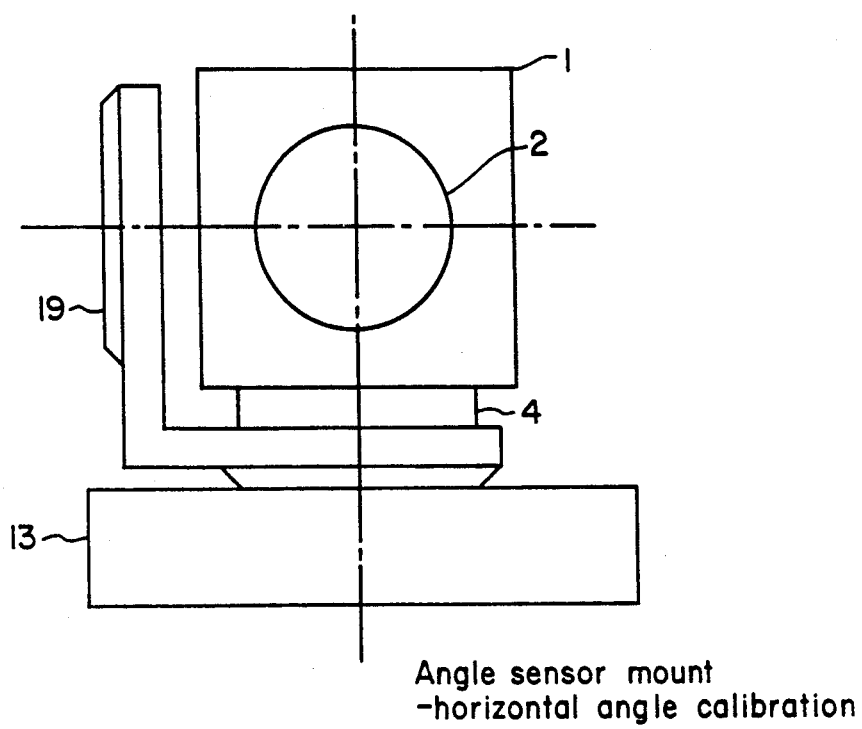
Angle sensor mount
-horizontal angle calibration
FIG. 4d2
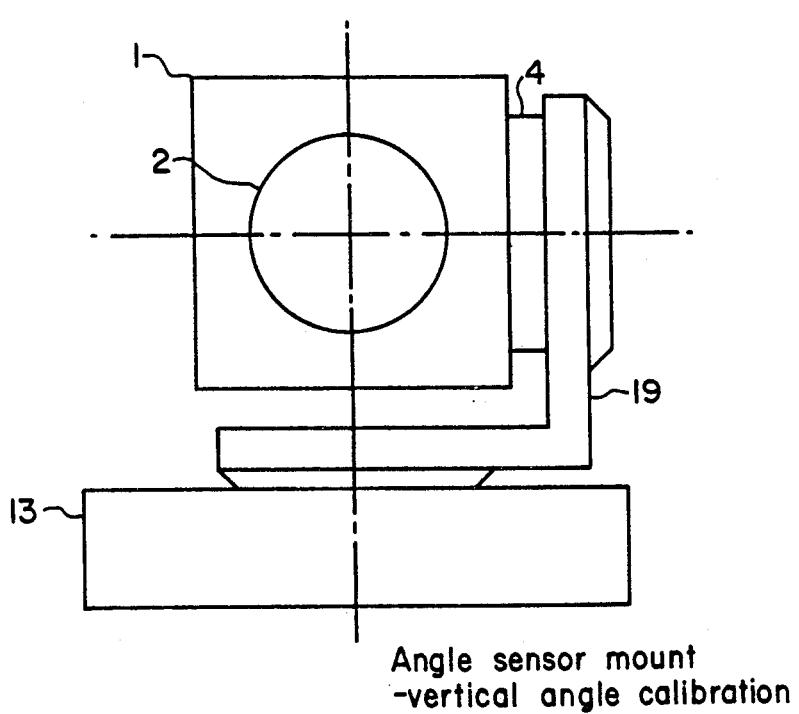
Angle sensor mount
-vertical angle calibration

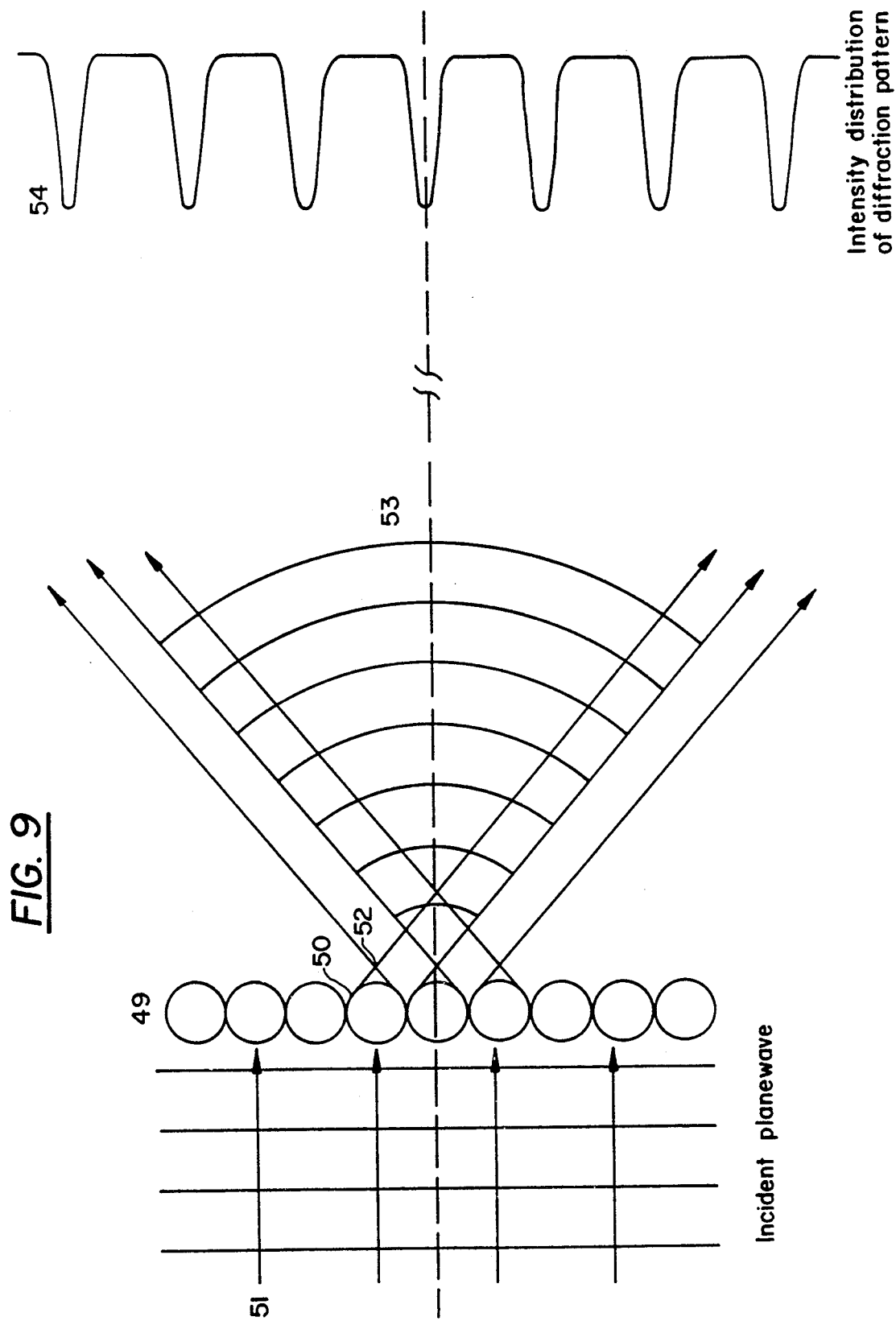

METHOD AND SENSOR FOR OPTO-ELECTRONIC ANGLE MEASUREMENTS

FIELD OF THE INVENTION

The present invention relates to an opto-electronic angle measurement device, methods for calibration of said device for two-dimensional (spatial) angle measurements, and use of said device in position and geometry measurement systems, as well as an opto-electronic system for simultaneous measurements of the three dimensional coordinates of a plurality of points on a surface.

More specifically the invention relates to an opto-electronic sensor for measuring directions in two dimensions to point sized active light sources or to points illuminated by light sources. Said opto-electronic angle measurement device is calibrated once and for all for angle measurements in two dimensions (spatial direction) towards light sources or light reflecting points illuminated by one or more light sources, using a high precision angle reference.

Furthermore, the invention relates to a general opto-electronic system for spatial coordinate measurements for one or more light sources or light reflecting points illuminated by one or more light sources, including at least two angle sensors. Said system is applied for non-contact measurements of object position, orientation, and/or surface geometry.

The invention includes a method to determine the location of the rotational axes of the lens-system of said opto-electronic sensor, as well as methods for calibrating said opto-electronic sensor for measuring the angular direction in two dimensions to a light source or to a point illuminated by a light source.

Furthermore, the invention relates to an opto-electronic system for simultaneous measurement of the co-ordinates of a plurality of points on a surface, comprising a device designed to project a plurality of light spots on a surface in combination with angle sensors. This device consists of one or two gratings, dividing a collimated light beam into multiple beams which are focused to a pattern of point sized light spots on the surface, e.g. as described in Applied Optics, Vol. 23, No. 2, Jan. 15, 1984, pages 330–332.

DESCRIPTION OF THE RELATED ART

Non contact angle measurements are conventionally done by using a theodolite which is aimed manually at the target. The state of the art in this field is fully automatic, serve controlled theodolites as manufactured by Kern and Wild Leitz. Such devices can be automatically aimed at targets of known shape if the approximate positions of the targets are known. Thereby angles in two dimensions can be read automatically. The fact that the theodolite is physically directed towards each target using a servomotor system, means that the system has a very limited measurement frequency.

Non-contact, automatic geometry measurements are in great demand for surface profile surveying, e.g. in automotive industry. Today, mechanical coordinate measurement machines (CMM's) are used for these applications. CMM's are expensive, complex, inflexible and most of them are in direct contact with the surface. These limitations make them unapplicable in production line setups, hence, present quality control is based on spot testing by templates.

Present opto-electronic systems can be divided in three categories according to their measurement principle: structured light, range measurements (optical radar) and triangulation techniques.

Structured light techniques are based on projection of light spots or lines onto a surface to measure its shape, e.g. Moiré-techniques. Common characteristics of these techniques are that the image of the projected pattern is registered using video cameras or conventional photography, and that a reference surface or an image of a reference pattern is needed to calibrate the system in its actual setup.

Range measuring techniques, usually based on measuring the time of flight of a laser pulse, have a very high depth resolution, but low lateral resolution and a limited measurement field.

Several companies manufacture opto-electronic systems based on triangulation, e.g. Seatex in Norway or Sagem in France. Their systems use a single opto-electronic sensor, and include the direction of the laser beam as the second known direction for their triangulation calculation. The difficulties of accurately and stably directing a laser beam restricts the accuracy of the systems, and on-site calibration is necessary. The need for a fixed, well known baseline limits the flexibility of the work range.

Furthermore, it is an object of the present invention to produce a fully automatic and non-contact angle sensor which is factory-calibrated once and for all for high precision measurements. No further calibration is necessary in a measurement setup, except for definition of coordinate systems. Furthermore, the object of the present invention is that the angle sensor shall not contain any moveable parts, shall be nearly insensitive to background light, and allow for simultaneous measurement of angles for several points.

Finally the present invention enables very fast and accurate measurements of the three dimensional coordinates of a plurality of points on a surface.

According to the present invention, the characteristic features of the sensor mentioned in the introduction are that means are included to compute the spatial direction of said light sources or illuminated points from the position of the image of said light sources or illuminated points as registered in the local coordinates of said array of photosensitive elements, said means including a two dimensional calibration table, that said calibration table is generated once and for all by a calibration that allows the angle sensor to be used in various locations without requiring any recalibration, said calibration comprising:

determination of the centre of rotational symmetry of the angle sensor lens, by correction of the position of an adjustable mounting fixture attached to the angle sensor in a position corresponding to the rotational axes of said sensor, such that if the lens optical axis is defined as the x axis, the vertical symmetry axis of said mounting fixture defines the z axis of the angle sensor which is the axis defining horizontal angles, and the y axis defining vertical angles is defined by its orthogonality to said x and z axes, by having the angle sensor mounted onto the top of a rotary table, and levelled to ensure that the optical axis is horizontal, by mounting a minimum of two light sources at approximately the same level as the optical axis, such that a straight line can be drawn through the two light sources and the rotational axis of the rotary table, and by adjusting the mount of the angle sensor to the rotary table until the images of the two light sources are overlapping, whatever is the rotary position of the angle sensor, and clamping said mounting fixture to the angle sensor in this position, calibration of said angle sensor for measurement of angles relative to said two rotational axes, by the use of a high precision rotary table and a substantially vertically mounted linear array of light sources or illuminated reflecting points, by having the angle sensor mounted onto the top of said rotary table and levelled such that one of its rotational axes is exactly vertical, parallel and coincides with the rotational axis of the rotary table, by having the linear array of light sources or illuminated points mounted parallel to said rotational axis, and by step-wise rotating the angle sensor while the image of the linear array of light sources or illuminated points and the corresponding rotary table angle are simultaneously registered for every step, to allow for calculation of the mathematical relation between the angle and the position of the image on the photosensitive array, and that this procedure is repeated for the second rotational axis of the angle sensor, followed by processing of all data to establish said two-dimensional calibration table relating image coordinates to spatial directions given as horizontal and vertical angles, that said calibration table is obtained using light sources having a well defined and known spectral distribution, and that means are included for statistical analysis of the intensity values registered by multiple neighbouring photosensitive elements, to improve the resolution and accuracy of the angle measurements to fractions of the size of said photosensitive elements.

The photosensitive elements can e.g. be CCD- or CID-sensors. The well-defined centre of rotational symmetry of the lens gives an unambiguous definition of spatial directions, by all points having the same direction relative to this point is imaged in the same point on the sensor.

The use of the angle sensor is restricted to measurement of the direction to active light sources or light reflecting points illuminated by active light sources having the same spectral distribution as those that where used for calibration. This ensures high measurement accuracy as a high signal-to-noise ratio is obtained and no chromatic aberration contributes to the error.

According to the invention, two practical implementation are proposed for said linear array of light sources used to calibrate the opto-electronic angle sensor. Automated calibration procedures are suggested, allowing for a high number of registrations, and hence ensures high precision.

In accordance with the present invention, the characteristic features of the above mentioned general geometry measurement system are:

that said system includes dedicated image processing units, said units processing the image registered by each angle sensor to two dimensional angular values for each light source or illuminated point, that said system includes a data processor for computation of the coordinates of each light source or illuminated point, that said data processor includes means to obtain the relations between the internal coordinate system of the individual angle sensors and the global coordinate system, either by mounting the angle sensors levelled and in known positions, and calculating their orientations from the measured spatial directions to a light source or an illuminated point which is located in a known position and thereby used as a common reference point, or by designing said data processor for calculation of the positions and orientations of the angle sensors on the basis of measured directions to at least three light point sources in known global coordinates, or by designing said data processor for calculation of the positions and orientations of the angle sensors on the basis of measured directions to a number of given light points, where the mutual separation distance is known for at least two thereof, and the position of a third point relative to said two define the orientation of the global coordinate system.

Further characteristic features of the angle sensor and the general geometry measurement system, as well as applications of said system, are given in the subsequent patent claims.

The characteristic features of the opto-electronic system for measuring spatial coordinates of a plurality of points located on a surface are:

that the system includes means to illuminate the surface point by point, comprising a directed light source emitting a light beam, a diffraction grating made up from multiple optical fibres or a technically equivalent diffraction grating, and focusing optics to obtain a pattern of well defined discrete point sized light spots forming a curved line across the surface, that the system includes a minimum of two angle sensors to register the location of the projected light spots as spatial directions relative to said angle sensors, and that means are included to compute spatial coordinates for each discrete light spot based on the registered spatial directions relative to the angle sensors.

BRIEF DESCRIPTION OF THE DRAWINGS

Further characteristic features of the present invention are given in the following description of examples being non-limitative to the invention, with reference to the accompanying drawings.

FIG. 1 *c* shows the angle sensor from below.

FIG. 4 *d* illustrates the angle sensor mount for horizontal and vertical angle calibrations.

FIG. 5 *c* illustrates a mechanical device used to tilt and rotate the angle sensor for vertical angle calibration.

FIG. 9-10 illustrate dividing a laser beam into a plurality of beams to form a plurality of focused spots along a straight line.

DETAILED DESCRIPTION OF THE PREFERRED EMBODIMENTS

Figure 1A:
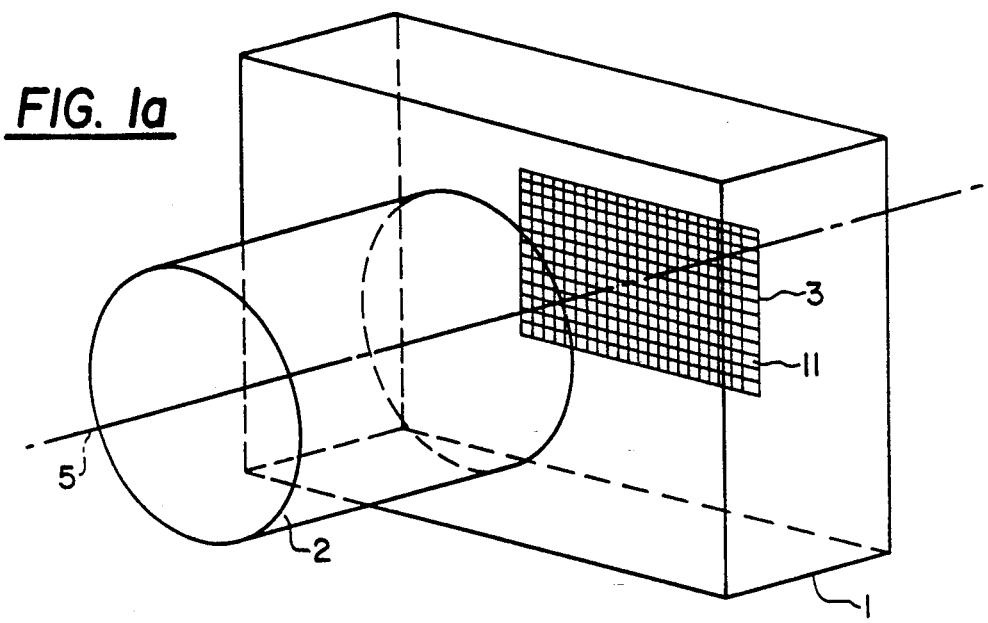
FIG. 1 *a-b* illustrate the basic components of an angle sensor.
Figure 1B:
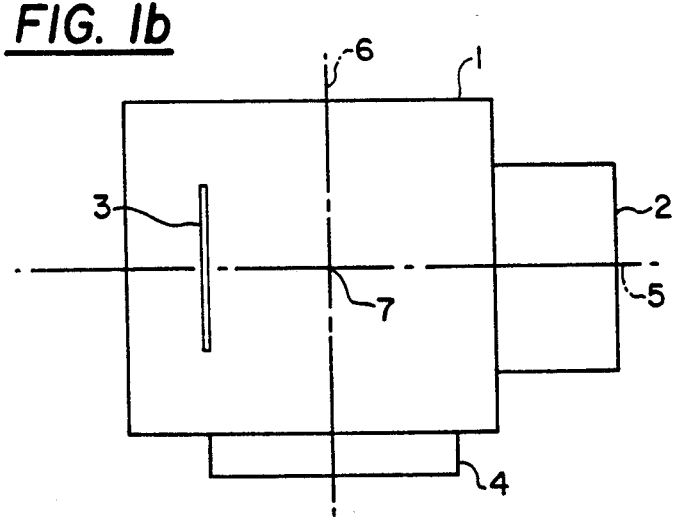
Figure 1C:
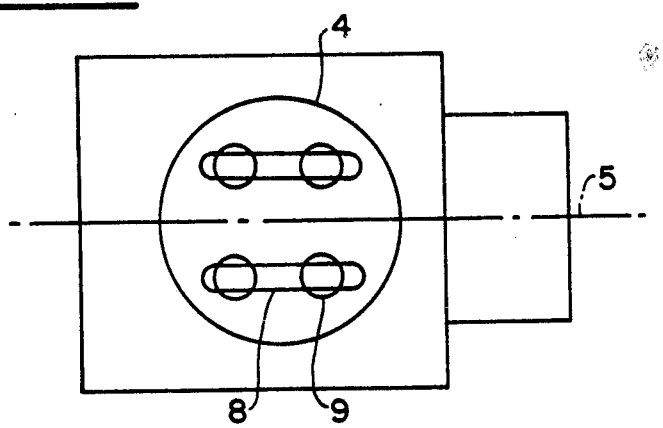

The present invention for position and geometry measurements is based upon a fully automatic and accurately factory-calibrated angle sensor as illustrated in FIG. 1. The angle sensor is built up as a conventional solid state video camera, consisting of a camera housing 1, a lens 2, and a two-dimensional array 3 of photosensitive elements 11. The lens is a standard spherical camera lens, having a focal length mainly given by the field of view requirements. If the lens possibly has an anti-reflection coating or optical filter, it has to be matched to the spectral distribution of the light sources to be used. The photosensitive elements may for example be CCD's (Charge Coupled Device) or CID's (Charge Injected Device). Due to the high precision specifications, arrays of highest available resolution are used. In systems where the measurement speed is the number one priority, lower resolution arrays are used.

Camera of said type is commercially available. This camera is made into an angle sensor by the fact that the lens 2 has a well defined and known centre of rotational symmetry 7, defined by the fact that the images of points located in the same direction relative to this centre are exactly overlapping. This centre of symmetry is always located on the optical axis. A spatial direction is given as angles relative to two orthogonal axes. In this case any pair of mutually orthogonal axes having origin in said centre of symmetry, and being normal to the optical axis, could be used. According to conventions, a horizontal and a vertical axis are used. The two axes are parallel to the horizontal and vertical axes of the camera housing. A mechanical mounting fixture 4 can be adjusted by the use of slits 8 and bolts 9 to define the vertical axis of rotation 6. Due to the spherical optics, the corresponding horizontal rotational axis is defined by its orthogonality to the vertical axis and the optical axis. The angle sensor is calibrated to measure angles in two dimensions relative to these two rotational axes.

Figure 2A:
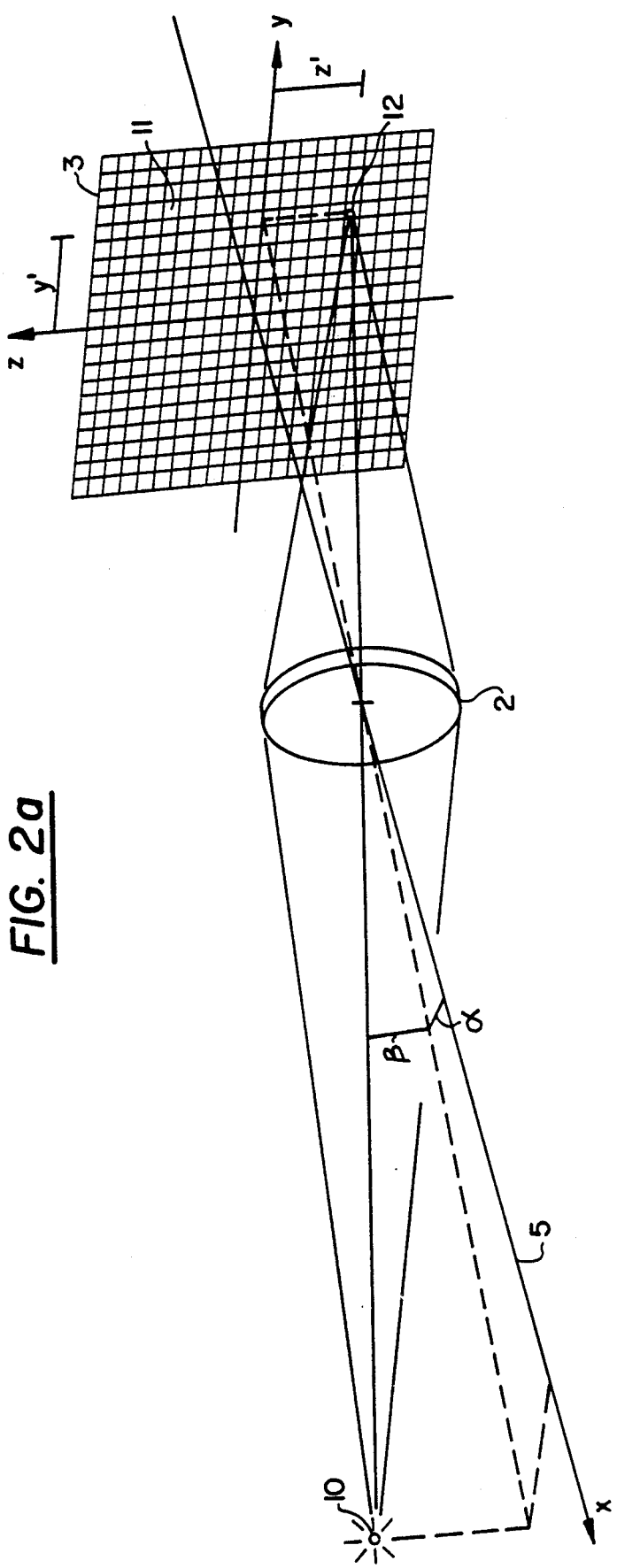
FIG. 2 *a-c* illustrate the angle measurement principle.
Figure 2B:
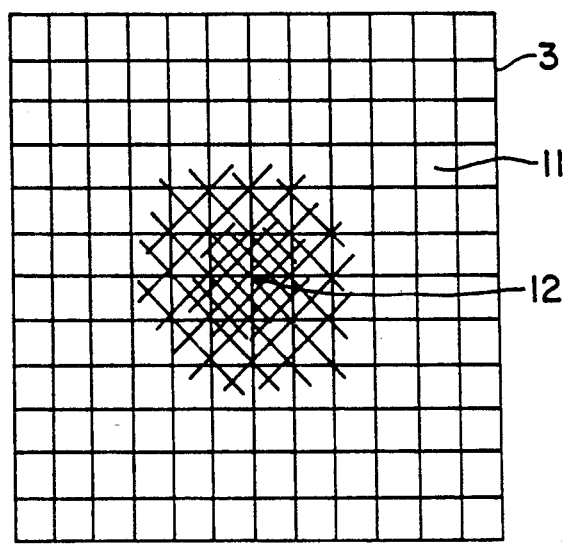
Figure 2C:
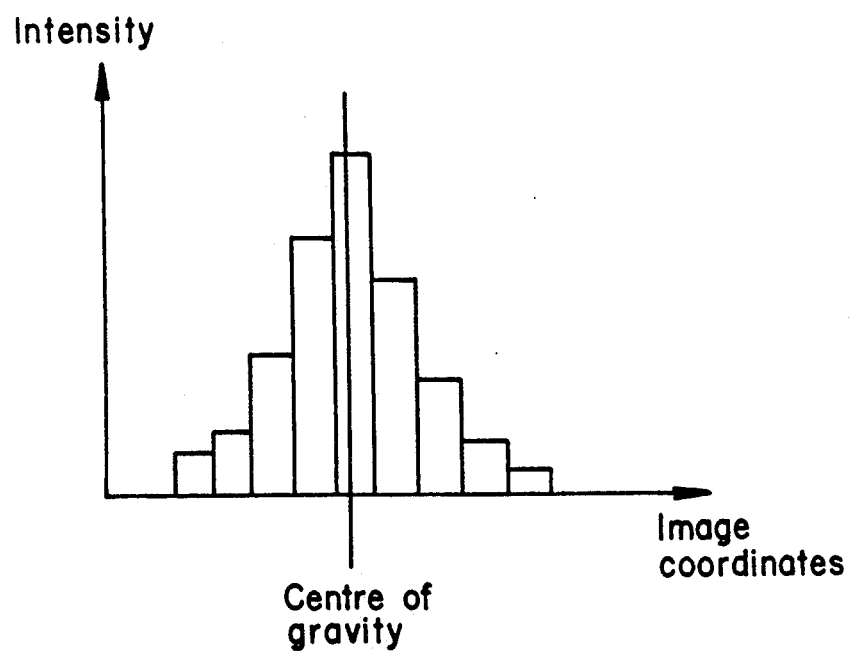

FIG. 2 a illustrates the principle of measuring the spatial direction. The fully automatic function of the angle sensor is based on the use of active light sources, e.g. light emitting diodes, or points 10 illuminated by active light sources, e.g. lasers or laser diodes, directed towards a surface. The lens 2 images the light point source 10 onto the array 3 of photosensitive elements 11 as an illuminated spot 12. The image provides illumination of a number of the photosensitive elements 11 with an intensity distribution given by the size of the light point source 10, and the optical resolution of the lens 2. The position of the light spot 12 on the array, is a unique measure of the spatial direction to the imaged point 10. The spatial direction is given as two angles $\alpha$ and $\beta$. $\beta$ is the angle between the spatial direction and the horizontal level of symmetry given by the angle sensor, $\alpha$ is the angle between the optical axis and the direction to the projection of the light point source 10 onto the horizontal level of symmetry. $\alpha$ and $\beta$ are both 0 for points along the optical axis.

For most applications, the resolution of the photosensitive array by itself is too low. To improve the resolution, the position of the light spot on the array is calculated more accurately using a statistical analysis of the intensity distribution, e.g. a centre of gravity calculation as illustrated in FIGS. 2 b and 2 c.

The lens 2 has an aperture angle limiting the measurement area of the angle sensor. A typical field of view is 30 degrees both horizontally and vertically. No strict requirements are set to the lens distortion properties, as these are corrected by the calibration method, hence a distortion free lens is not required. Due to this large field of view, any mechanical rotation of the angle sensor to aim it at the measurement point as with conventional or automatic theodolites, is avoided. The angle sensor is calibrated at a fixed focus distance. The lens depth of field restricts the longitudinal work range of the angle sensor.

The angle sensors are designed to measure the directions to light sources emitting light at a well defined spectral distribution, usually in the visible or near infrared spectral region. The position of the focal plane, and hence the image of a light spot depends on the spectral distribution of the light. Thus the angle sensor is calibrated to be used at well defined wavelengths, and the calibration is made using active light sources or points illuminated by light sources having this spectral distribution. This technique ensures high accuracy, and enables automatic separation of the light point sources in question from the background. The signal-to-noise ratio is improved using an optical filter matched to the spectral distribution of the light sources. The filter has to be mounted prior to calibration due to its optical influence on the lens system.

The proposed applications of the angle sensors rely on high precision angle measurements. Hence accurate methods are needed to determine the centre of rotational symmetry and to calibrate the angle sensors. To obtain a high calibration accuracy, a large number of calibration measurements has to be made. Hence, extensive work has been carried out to develop fully automatic calibration methods.

Figure 3A:
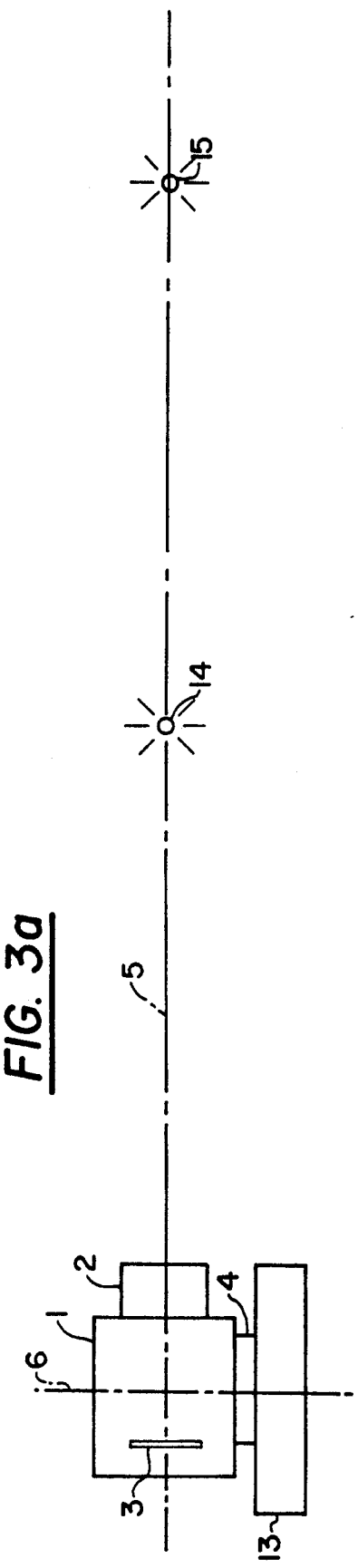
FIG. 3 *a-b* illustrate a method for adjustment of the angle sensor mount relative to the centre of rotational symmetry.
Figure 3B:
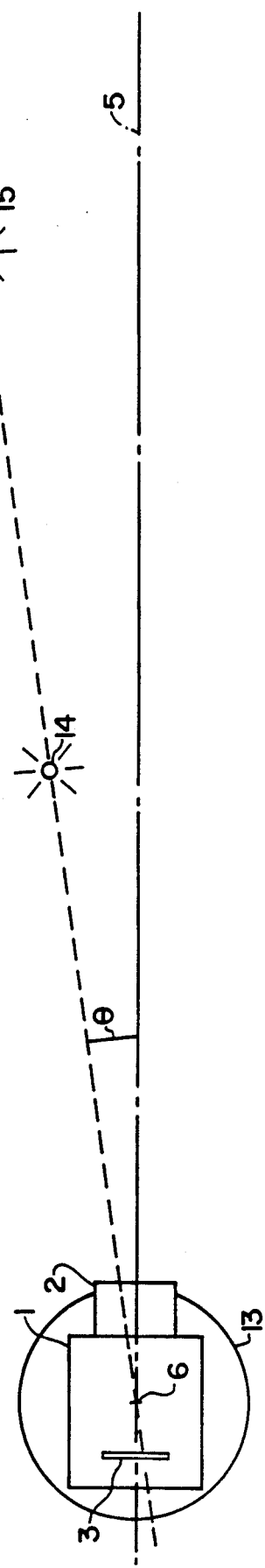

As mentioned in the introductory part, the present invention is based on the existence of a centre of rotational symmetry giving an unambiguous definition of the direction towards light spots. The definition of the centre of rotational symmetry of the lens is that all light sources or illuminated points located in the same direction relative to this point are imaged at exactly the same point at the focal plane of the lens. This means that the position of the intensity maxima registered by the photosensitive array are the same for all such points. This definition is used to adjust the position of the mounting fixture 4 as illustrated in FIGS. 3a and 3b.

The angle sensor is mounted onto the top of a rotary table 13 and levelled. A minimum of two light sources 14, 15 are mounted in a line in the horizontal symmetry plane of the angle sensor. If the setup is observed from above as in FIG. 3b, an exactly straight line can be drawn through the rotational axis of the rotary table and the two light sources. The heights of the two light sources are allowed to differ slightly to form two different image spots on the photosensitive array. Larger height differences may cause errors due to lens distortions. The mutual separation of the two light sources is restricted by the lens depth of field.

The adjustable mounting fixture 4 is moved parallel to the optical axis of the lens until the horizontal positions of the intensity maxima of the two image spots coincide for any rotation angle θ of the angle sensor. To obtain maximum sensitivity, the angle sensor is rotated to the very limits of its field of view. The mounting fixture is clamped in the correct position using the bolts 9.

This method determines the vertical rotational axis 6 (z-axis) of the lens, and hence an unambiguous definition of the centre of rotational symmetry is where the z-axis 6 intersects the optical axis 5. Thus the mounting fixture determines the vertical rotational axis, which defines horizontal angles.

The third axis of symmetry (y-axis) is defined by its orthogonality to the optical axis and the vertical axis as found above, and their common origin. The standard angle sensor does not have any mounting fixture related to this axis. A mounting bracket 19 is used to determine this axis for the calibration procedure, as described below. This bracket is dismounted after calibration.

The principle of the angle sensor calibration methods is to mount the angle sensor onto the top of a rotary table, and to register the image positions of a linear array of light sources or illuminated points as a function of rotational angle as the rotary table is rotated step by step. The angle sensor should be calibrated under conditions resembling those of a real measurement setup. Two alternative calibration methods have been developed. A technique that uses point-sized active light sources is described below. A simpler calibration method is based on replacing the separate light sources with a linear light source, e.g. an illuminated string or slit.

Figure 4A:
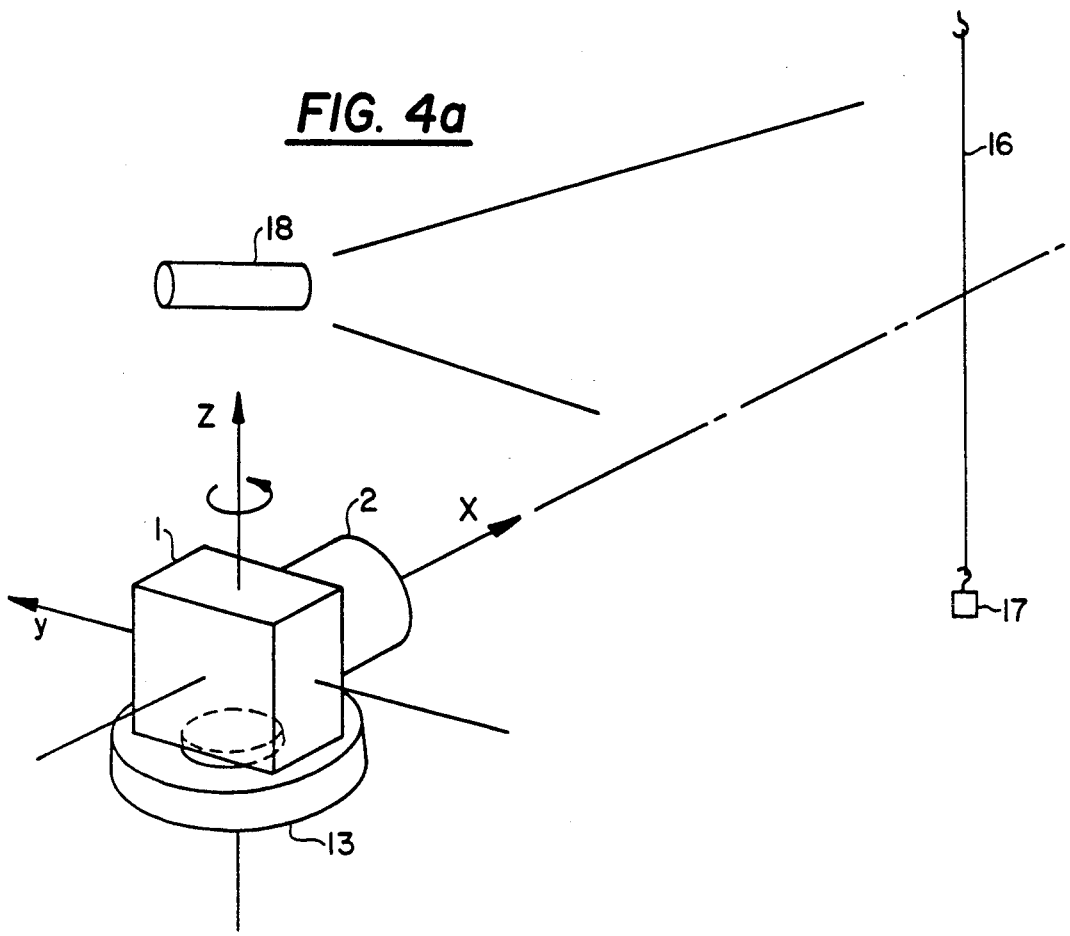
FIG. 4 *a-c* illustrate a method for angle sensor calibration, using an illuminated string or slit.

Calibration by the use of a linear light source is illustrated in FIG. 4a. The angle sensor is mounted onto the top of the rotary table 13. The rotary table includes a high precision angle reference, and is servo controlled to allow for automatic function. The angle sensor is levelled, and the position of the mounting fixture is adjusted as described above. Thus the rotational axes of the angle sensor and the rotary table coincide. A linear device is mounted vertically. In the following description a string 16 is used as an example of a such a linear device. However, e.g. a slit can be used in a similar manner, except for the illumination technique. In the case of a string, it is illuminated to give diffusely reflected light to be registered by the angle sensor. If a slit is to be used, it would be mounted in front of an illuminated background to form a narrow illuminated line.

The easiest way to mount an exactly vertical string is by attaching a plumb bob 17 to it. The length of the string corresponds to the vertical field of view of the angle sensor. The string is illuminated by a light source 18. This illumination covers all or parts of the string. Point by point illumination can be used to obtain closer resemblance to the point sized light sources used in an actual measurement setup. In such a case, the light spot can be moved up and down the string by the use of a rotary mirror.

Figure 4B:
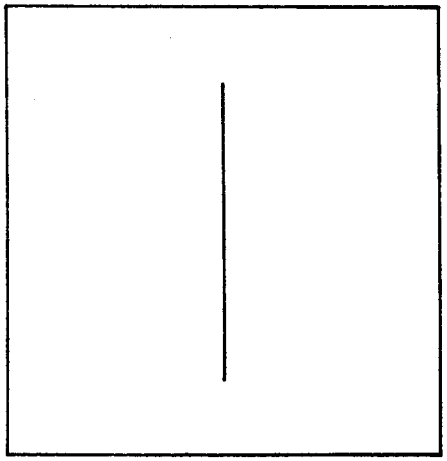
Figure 4C:
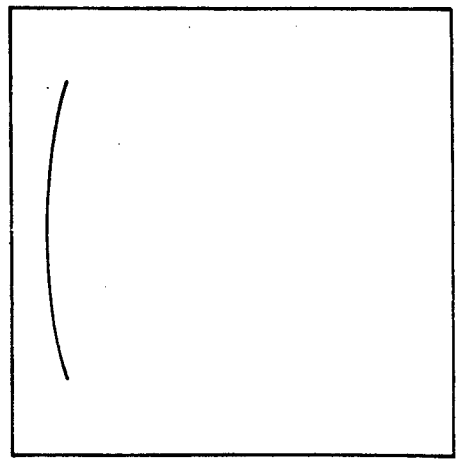

The image of the string has a line-shaped intensity distribution, as shown in FIG. 4b. The line has a curvature given by lens distortions as illustrated in FIG. 4c. As the table is rotated stepwise, the position of the image of the line as registered by the photosensitive array, is measured as a function of rotary angle. As an alternative way, a similar result can be obtained using a fixed angle sensor, by moving the string linearly and horizontally in a well defined way relative to the optical axis of the lens.

The calibration procedure is repeated after rotating the angle sensor 90 degrees around its optical axis, and mounting it to the top of the rotary table using the bracket 19 as shown in FIG. 4d. The two sets of data are processed to form a two-dimensional calibration table, to be stored in a two-dimensional memory array in the corresponding image processing unit.

The second calibration method is based on using a plurality of light sources mounted in a vertical, one-dimensional array. To achieve the required accuracy, a large number of light sources has to cover the entire vertical field of view. According to the present invention, the accuracy can be improved without increasing the number of light sources, using a method based on stepwise tilting the angle sensor. For each tilted position, a part of the photosensitive array is calibrated. Using this method, the light sources can be reduced to a short one-dimensional array covering a part of the vertical field of view only.

Figure 5A:
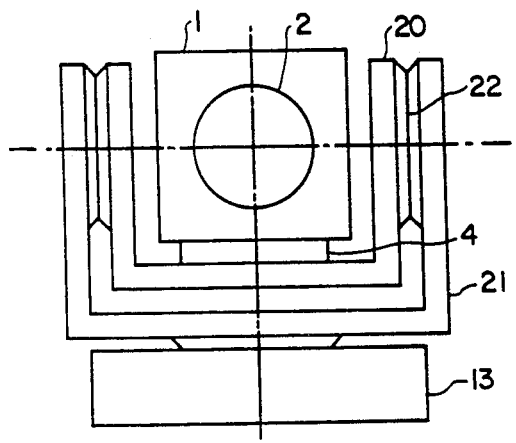
FIG. 5 *a-b* shows a mechanical device used to tilt and rotate the angle sensor.
Figure 5C:
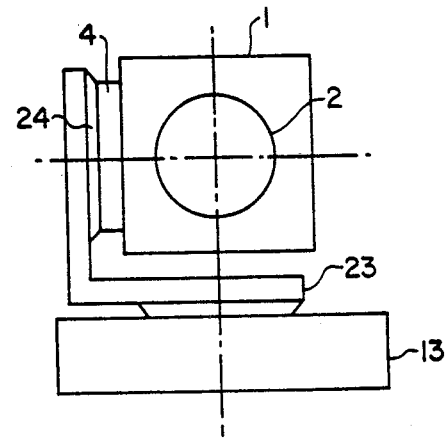
Figure 5B:
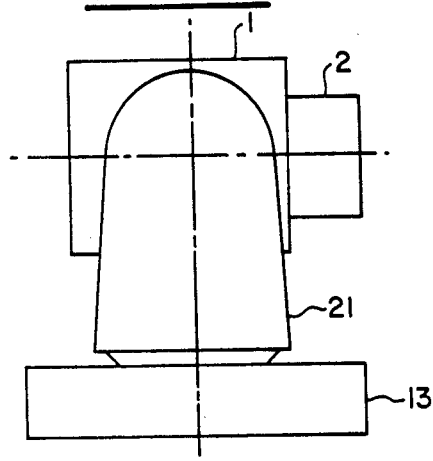

Two dedicated mechanical tilting devices, as shown in figures 5a, 5b and 5c, and numbered 21 or 23, have been developed to tilt the angle sensor around a horizontal axis normal to the optical axis. The two alternative devices 21 or 23 are used depending on which of the two rotational axes that is to be calibrated. To calibrate the vertical axis, the device made up from the brackets 20 and 21 as mounted to the angle sensor and rotary table, respectively, is used. The two brackets 20, 21 are connected using a rotary adapter 22. To calibrate the horizontal axis, the bracket 23 is mounted to the angle sensor using a rotary adapter 24.

Figure 6A:
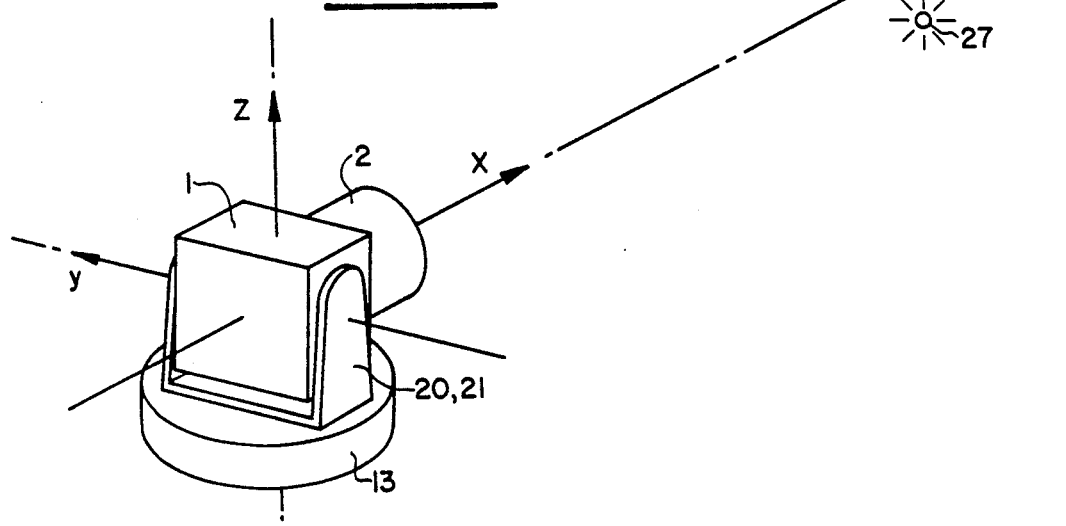
FIG. 6 *a-e* illustrate a method for angle sensor calibration, using an array of active light sources or illuminated spots.
Figure 6C:
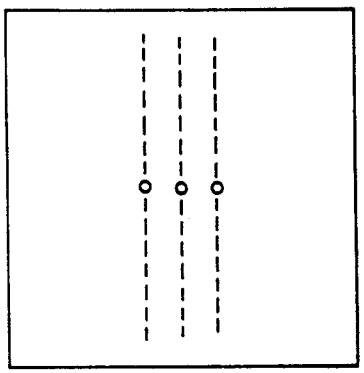
Figure 6E:
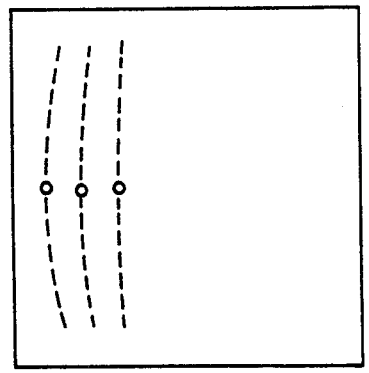
Figure 6B:
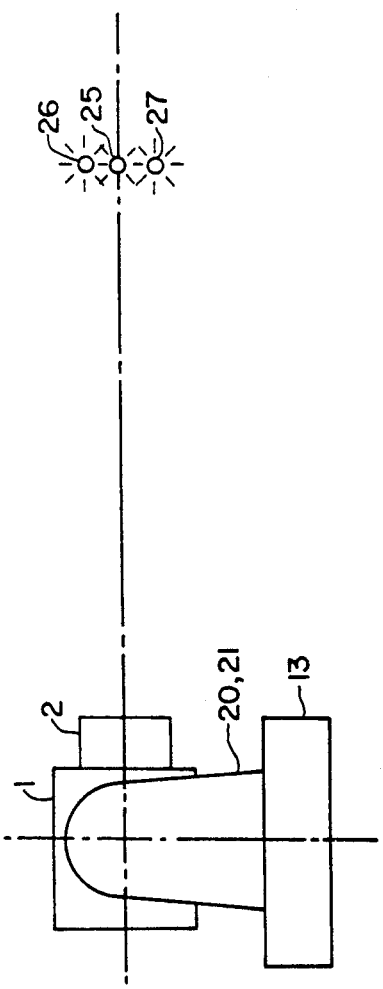
Figure 6D:
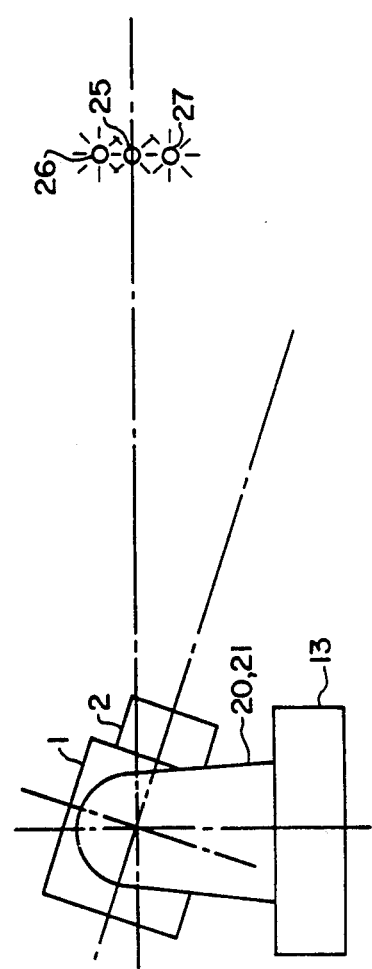

The angle sensor, including the tilting device, is mounted onto the rotary table 13 and is then levelled. The setup is illustrated in FIG. 6a. In this levelled position, the angle sensor is rotated around the vertical axis (z-axis), as shown in FIG. 6b. The calibration curves as illustrated in FIG. 6c, are obtained by simultaneous measurements of the angle of the rotary table 13, and the sensor position of the image of the individual light sources 25-27. In this position the middle part of the photosensitive array is calibrated. To calibrate the rest of the array, the angle sensor is tilted as illustrated in FIG. 6d. The tilt angle is measured, and the method is repeated, i.e. the rotary table is stepwise rotated, while the rotary angle and the image position is simultaneously registered to calculate the calibration curves, until the total field of view has been completely surveyed.

The tilt angle can be measured using an inclinometer. Alternatively the angle sensor itself can be used, by having this precalibrated in the two symmetry planes (corresponding to $\alpha=0$ or $\beta=0$ in FIG. 2a). Such a calibration is done by the use of one light source mounted in the same height as the centre of the angle sensor. To use this method for tilt angle measurements, a light source has to be mounted in this very same height.

The angle sensor is rotated 90 degrees around its optical axis, and the calibration method is repeated In this position the mounting bracket 23 is used. Note that the angle sensor again is tilted around a horizontal axis.

Based on the registered data, a two-dimensional calibration table is calculated and stored in the corresponding image processing unit in a two-dimensional memory array.

As when using a linear light source as described above, the rotary table can be replaced by a fixed angle sensor mount if mounting the light sources to a device that can be moved linearly and horizontally in small steps in a well defined way relative to the optical axis of the lens.

All calibration curves can be verified, using the rotary table as a reference, and measuring the angles to light sources in well known positions.

Figure 7:
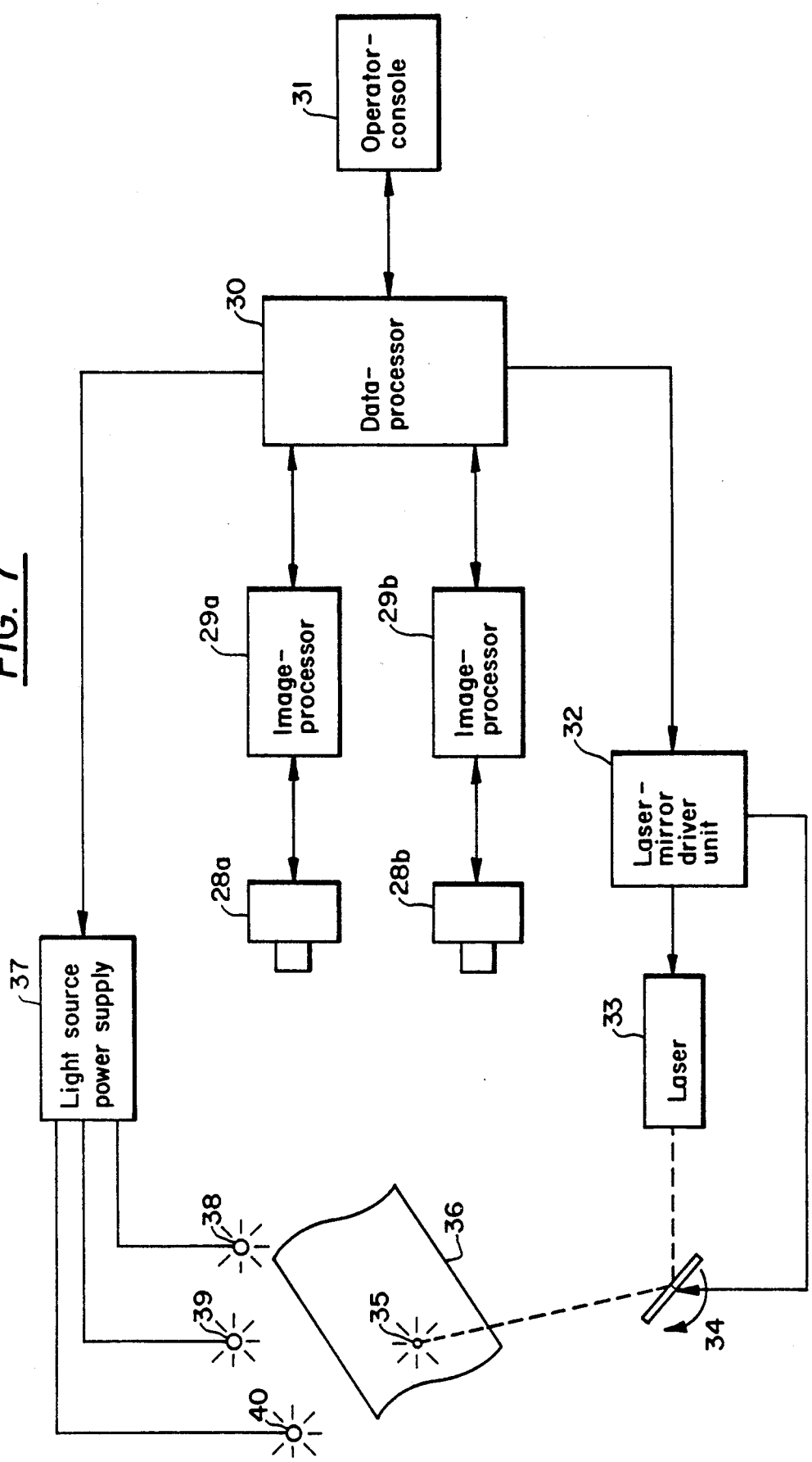
FIG. 7 is a block schematic view of a general geometry measurement system.

Said angle sensors can be combined to a number of different turnkey measurement system solutions, dependent on utilization. A general block schematic view is illustrated in FIG. 7. The schematic view shows a system built up from two angle sensors 28a,b, allowing for measurements of spatial positions of a number of light sources. The image data are transferred from the angle sensors to dedicated image processing units 29a,b as a sequence of analog or digital intensity values for each of the individual photosensitive elements.

The following operations are executed in the image processing unit:
  exposure timing controls,
  digitization of intensity values,
  storage of digital image data in a two-dimensional memory array,
  subtraction of a background light-noise image given as a stored image, as measured when no light source is lit,
  peak detection to find estimated position of a number of intensity maxima,
  calculation of the exact image position of each individual light spot given in the coordinate system of the photosensitive sensor,
  conversion of the image position coordinates to angle values relative to the horizontal and vertical rotational axes, using a two-dimensional calibration table as stored in a separate memory array.

The system is designed to deal with a number of simultaneously active light sources, as long as their mutual positions are unambiguous.

The angle values are transferred to a central data processor 30 for further calculations. The standard version of the data processor contains means for computation of three dimensional coordinates using triangulation or photogrammetric methods. Further features depends on application and system configuration. Typical applications are explained below.

The design of the image and data processor units is based on commercially available image processing hardware and software components.

The data processor has a console 31 connected to it. This console consists of a monitor and a keyboard for operator control functions. For example, this unit is used for on-line and off-line display of measurement results.

In systems for measurement of surface geometry using a laser or laser diode to illuminate points on the surface, a driver unit 32 is connected to the data processor to control the laser 33 and a dual axes mirror 34. The mirror is used to direct the light beam 35 onto the surface, and to scan the surface 36 in two dimensions.

Using separate active light sources 38-40, e.g. light emitting diodes, these are connected to the data processor via a driver unit 37. The driver unit supplies the light sources with power, and contains timing circuitry to turn them on and off for exposure control according to timing information given by the data processor.

Figure 8A:
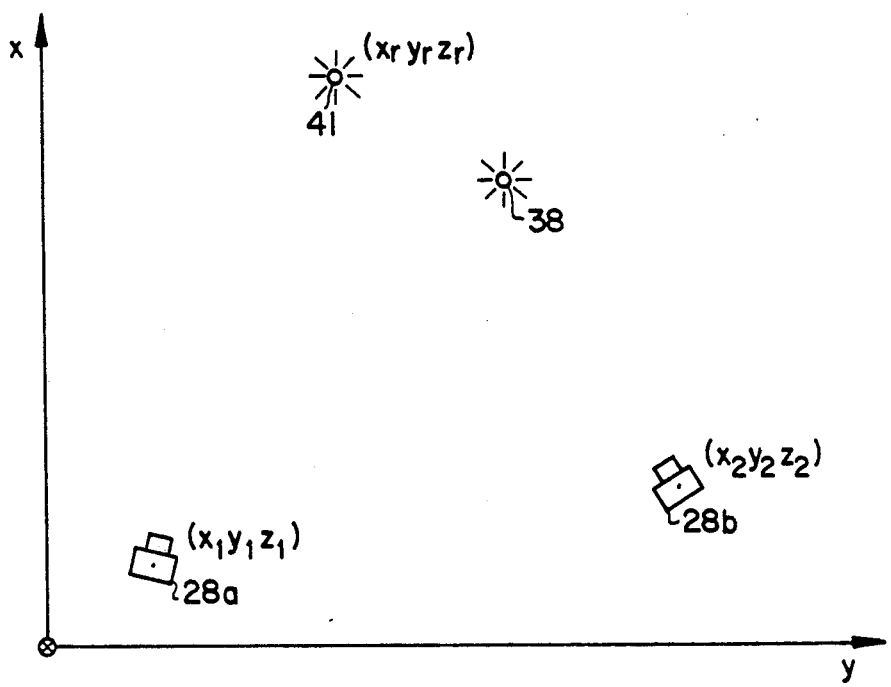
FIG. 8 *a-d* illustrate various applications of the geometry measurement system.

FIG. 8a illustrates how the system is basically applied to measure the three dimensional coordinates of a light point source or illuminated point. A minimum of two angle sensors 28a,b measure the horizontal and vertical angles of a point 38 relative to a reference point 41. For this application the data processor includes conventional triangulation software, as commercially available. This software is based on known coordinates for the two angle sensors and the reference point, given in a global coordinate system.

Different approaches exist to measure the position and spatial orientation of the angle sensors relative to a global coordinate system. A primitive way is to measure their positions using conventional surveying techniques, and to find their orientation using a reference light source in a well known position. To use this method, the angle sensors have to be levelled. A more sophisticated method is to measure the relative angles of three light sources in known global coordinates, and to calculate the angle sensor position and orientation from these measurements. A third method is bundle adjustments, which is based on measuring the relative angles of a number of light spots, the mutual distance being known for at least two of them and the coordinates of a third light source defining the orientation of the coordinate system. Bundle adjustments is an accurate method due to redundant measurements. The data processor includes software for the method to be used. This initiation routine must be run each time an angle sensor has been reoriented or moved to another position.

Using more than two angle sensors yields redundancy, and hence improve the reliability and precision of the measurements. By using only two angle sensors, redundancy is achieved for the z-coordinates.

Figure 8B:
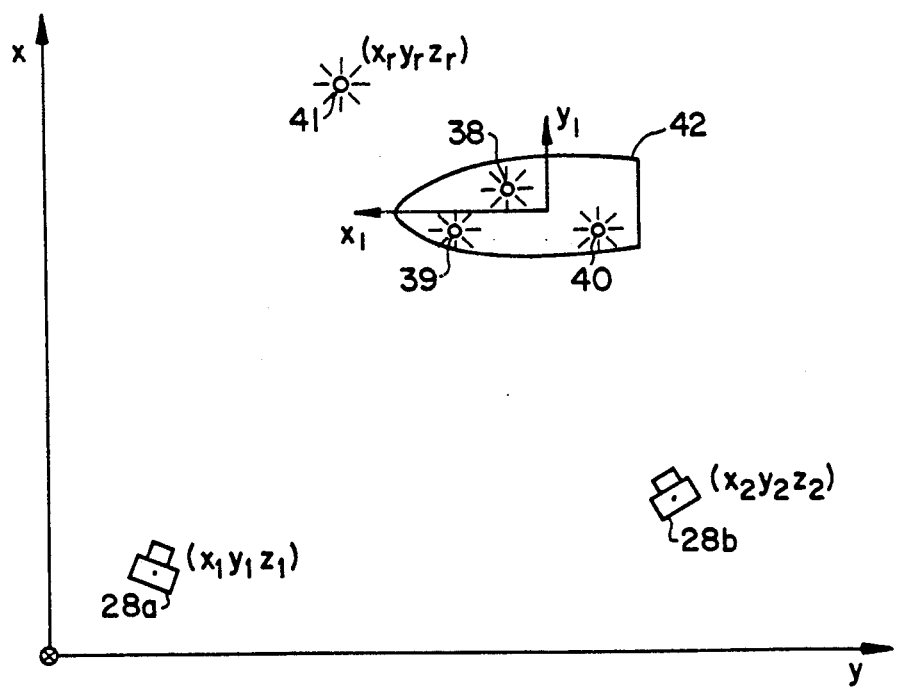

To measure the six degrees of freedom position and orientation of an object 42 as shown in FIG. 8b, requires a minimum of three light sources 38-40 to be attached to the object. The positions of the light sources should be well known in an object oriented coordinate system. The global coordinates of the three light sources are measured using a minimum of two angle sensors 28a,b and a reference light source 41 as described above. The relation of the measured global coordinates to the corresponding local coordinates is used to calculate the position and orientation of the object oriented coordinate system relative to the global one.

Redundancy, and hence improved accuracy is obtained if the number of angle sensors or light sources is increased.

Figure 8C:
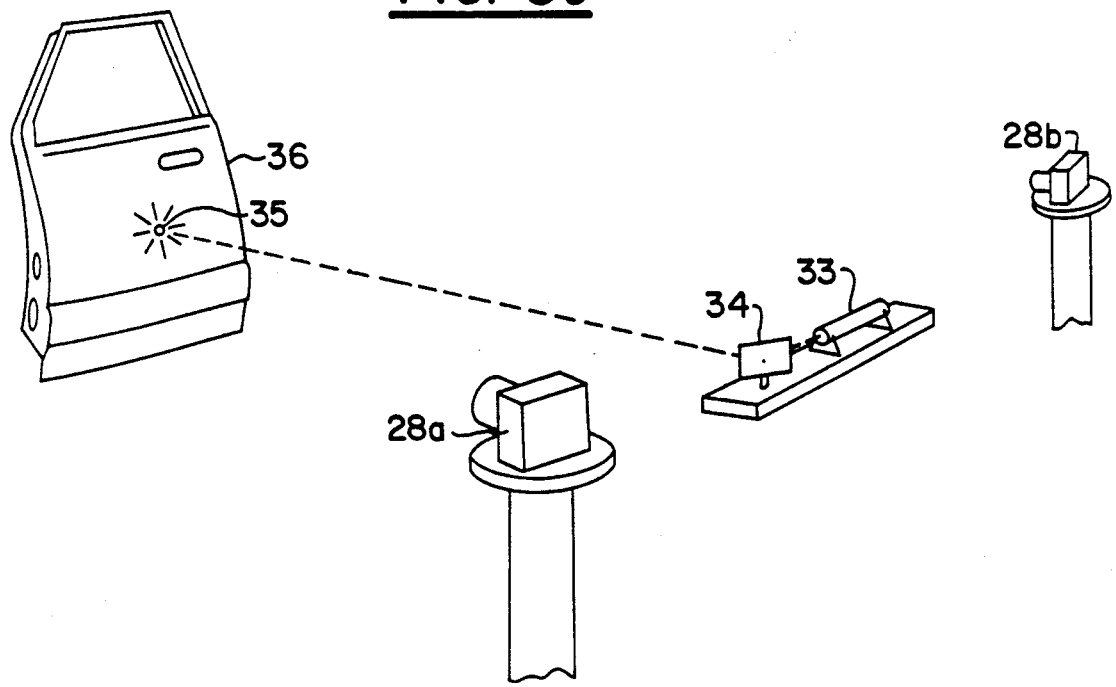

FIG. 8c illustrates an application of the angle sensor for profile measurements. A minimum of two angle sensors 28a,b are used to measure the three dimensional coordinates of an illuminated spot 35. The spot is generated by a laser scanning system consisting of a laser 33, and a dual axes mirror 34 which is used to direct the laser beam towards the object 36. The laser beam is focused to achieve a minimum sized light spot. Similar to the use of a dual axes mirror as shown, the laser itself can be rotated using a dual axis rotary system.

The laser scan system, consisting of laser, dual axes mirror, dynamic focus module and drive electronics, is commercially available.

As mentioned above, the laser scan driver is controlled by the data processor. The mirror is rotated stepwise, the step increment being given by the measurement accuracy requirements. In the data processor there is software for intelligent surface scanning, e.g. to register whether the laser beam hits the surface or not, or to measure the change of the measured angles as a function of laser beam angle to adapt the step increments to the curvature of the surface.

The data processor contains software to calculate a mathematical model describing the geometry of the surface on the basis of the measured coordinate values. The data processor is designed to be interfaced to a user supplied CAD (Computer Aided Design) system, e.g. to compare the measurement results to nominal design parameters.

Using the method as described above, the three dimensional surface coordinates are given as global coordinate values. The global coordinates can be transformed to a local object oriented coordinate system. As an example, this is easily done if the object has a minimum of three reference points having well known local coordinates. Measuring the global coordinates of these points give the information necessary for a coordinate transformation.

The applicability of the laser scan technique is restricted by the fact that the system measures the coordinates of single points, one by one, and that the system contains mechanically moving parts. To redirect the laser beam and to transfer all data from the photosensitive array are both time consuming processes.

Figure 8D:
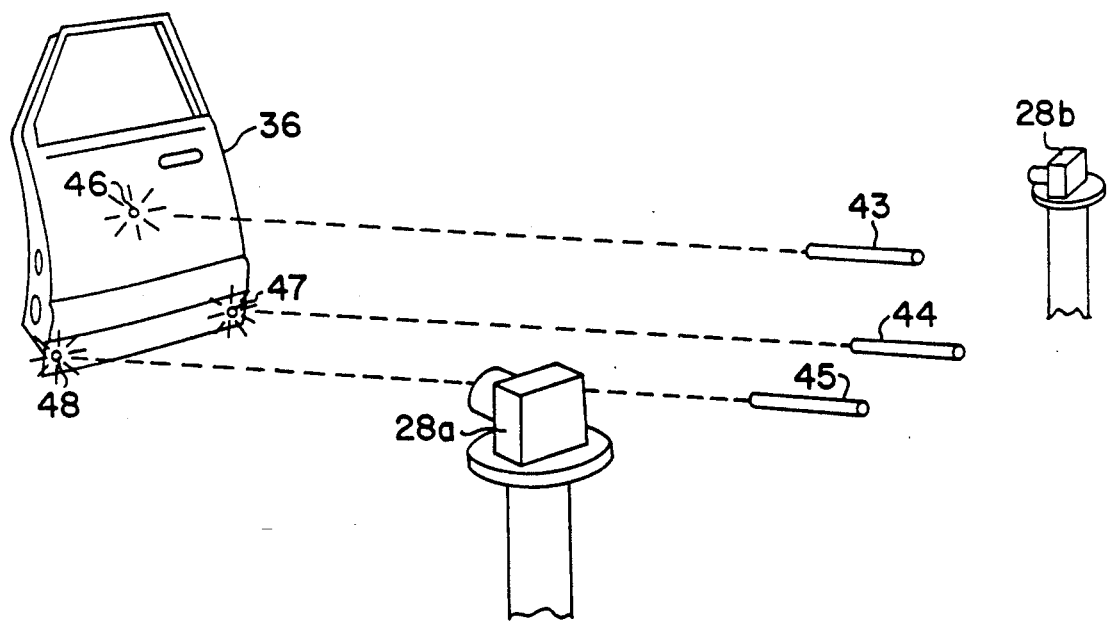

For a number of industrial applications, the essential features to be measured are the deviations between a manufactured object and the design model in a limited number of critical check points. A system according to the present invention can be applied using a number of lasers or laser diodes 43–45 mounted in fixed directions, pointing towards the critical points 46–48, as shown in FIG. 8d. All illuminated spots can be processed in parallel, giving a very fast presentation of all essential dimensional deviations.

This method is expensive, due to the fact that a separate light source is needed for each point to be measured, and a small number of check points are achieved.

The disadvantages of both profile measurement techniques as described above are overcome by the use of a system for simultaneous measurement of the spatial coordinates of a plurality of illuminated points, generated by the use of a projection device that projects a pattern of focused light spots onto a surface. Such a device may be made up from a newly commercially available diffraction grating as described in Applied Optics, Vol. 23, No. 2, Jan. 15, 1984, pages 330–332. These are based on parallel optical fibres, each fibre functioning as a cylindrical lens. The emitted light from the individual fibres interferes to form a close to ideal interference pattern. The characteristic features of these gratings are that the spot intensity is uniform, and that the spot diameter is close to that of the zero'th order beam. By mounting such a grating to the output of the laser, a large number of spots form a line across the surface.

A two dimensional pattern of illuminated points can be created in two ways. One is to use a single grating and to use a single axis rotary mirror to move the line of light spots across the surface. Another method is to mount two gratings together, to create a two dimensional pattern of light spots.

Technically equivalent means like conventional or holographic diffraction gratings can be used in similar ways. However, using the above mentioned type of angle sensors, conventional diffraction gratings are less applicable due to larger intensity and spot size variations.

A grating 49 consists of a large number of parallel optical fibres 50 arrayed as a monolayer as shown in FIG. 9. The figure illustrates a cross section of the grating. Each fibre 50 acts like a cylindrical lens. An incident plane wave 51 is split and focused by the fibres 50 into points 52 just behind the grating. From these points, cylindrical waves 53 are emitted, having wide angles of uniform intensity. Thus each fibre 50 can be considered as a light point source 52. The resulting diffraction pattern 54 corresponds to that of a conventional grating having infinitely small slit width. Such an ideal grating gives an infinite number of uniform intensity maximas. Using an optical fibre grating, typically 30–50 intensity maximas have an intensity higher than 50% of the zero'th order beam.

Figure 10:
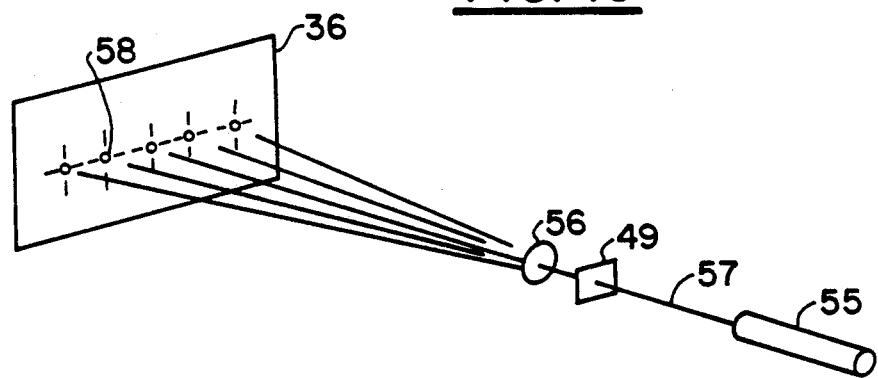

A complete system designed to project multiple light spots onto a surface is shown in FIG. 10. It consists of laser 55, fibre grating 49 and focusing optics 56. The collimated laser beam 57 is diffracted by the grating 49, and focused onto the surface 36. The optical design depends on the specifications with respect to focus distance and spot size. The grating splits the laser beam to multiple beams projected as light spots 58 forming a curved line across the surface. The relative angle between the diffracted beams is constant, and is a function of the fibre diameter.

Figure 11:
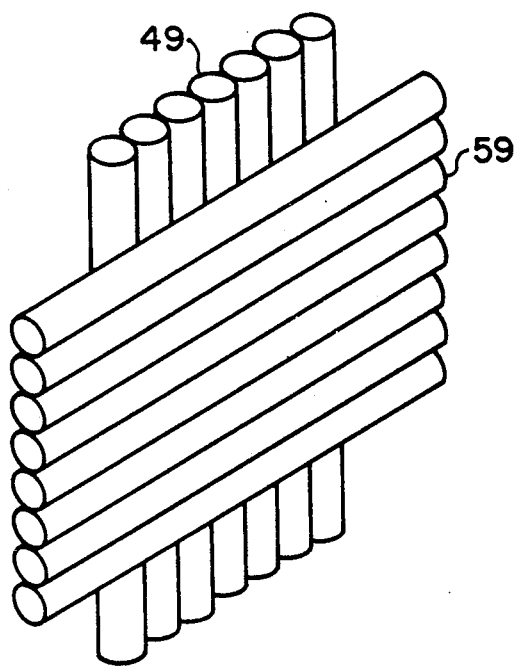
FIG. 11 illustrates the use of two mutually orthogonal gratings to form a two dimensional pattern of focused spots.

A two dimensional pattern of focused light spots is achieved by using an additional grating 59. This grating is mounted in such a way that the optical fibres (slits) are rotated relative to the first grating 49, as illustrated in FIG. 11. 90 degrees mutual rotation yields a rectangular pattern of light spots as shown in FIG. 12.

Figure 12:
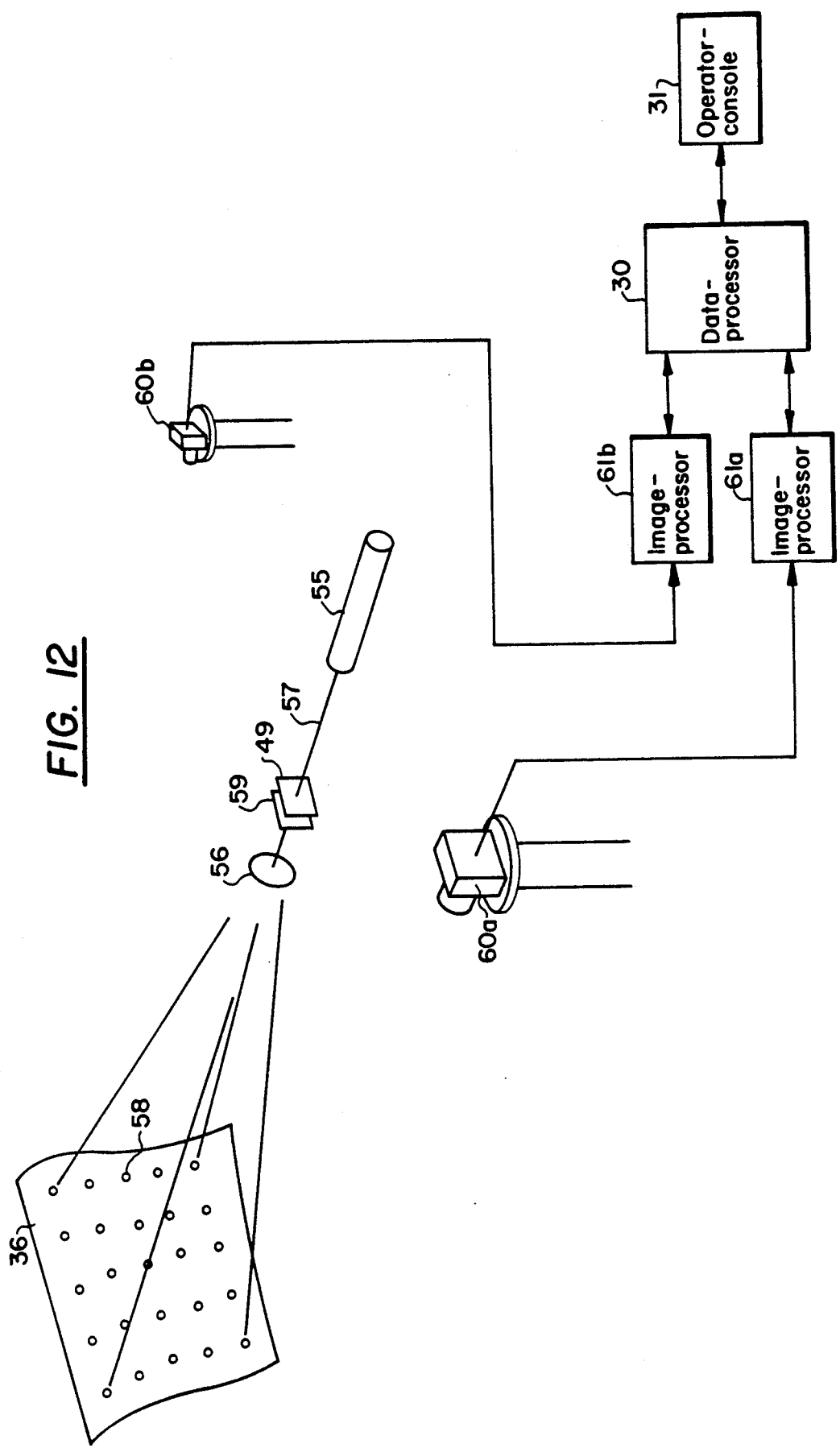
FIG. 12 illustrates a system configuration for surveying a surface profile, including two angle sensors, a laser and two gratings used to form a two dimensional pattern of focused spots.

FIG. 12 illustrates a complete system configuration for surface profile measurements. A two dimensional pattern of light spots 58 is projected onto a surface 36 by the use of two diffraction gratings 49, 59 and focusing optics 56. The three dimensional coordinates of each individual spot are found by measuring the spatial angles of each spot relative to two angle sensors 60a,b, e.g. sensors of the type described above. All light spots are simultaneously registered, such that for each image the photosensitive array contains a number of intensity maximas.

The system includes pre-processors 61a,b designed to register and process the data from the angle sensors. The design and function of the pre-processors depends on which type of angle sensors that are used as discussed below.

The angular data are transferred from the two pre-processors to a data processor 30 for three dimensional coordinate calculation. Standard triangulation or photogrammetric methods are used. This calculation is based on the existence of an unambiguous relationship between the data from the two angle sensors. This means that the system needs a way to identify which intensity maximum is corresponding to a specific light spot for every angle sensor, and thus the data processor includes a simple light spot recognition software. Another method is to manually identify each light spot prior to coordinate calculation.

Using one single grating, the identification procedure is simple. Across the photosensitive array a curved line of intensity maximas is registered. The curvature depends on the shape of the object.

Figure 13:
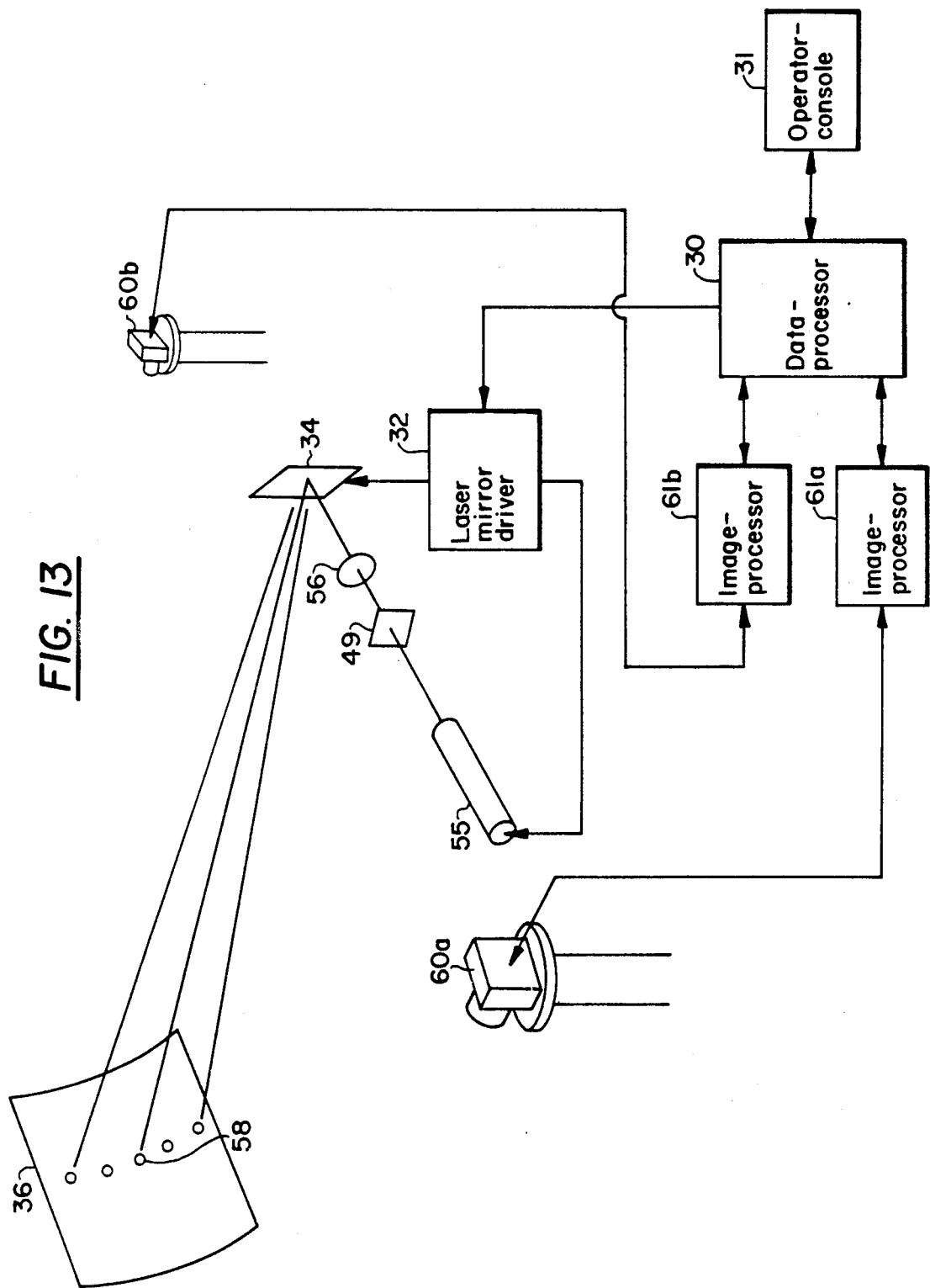
FIG. 13 illustrates the use of one grating and a rotary mirror to scan a surface.
Figure 14:
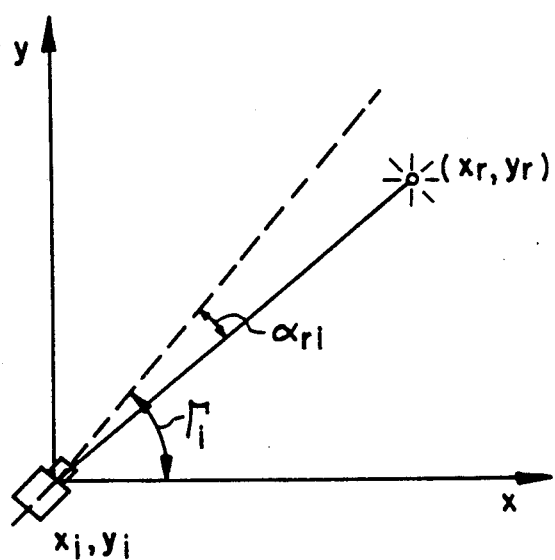
Figure 15:
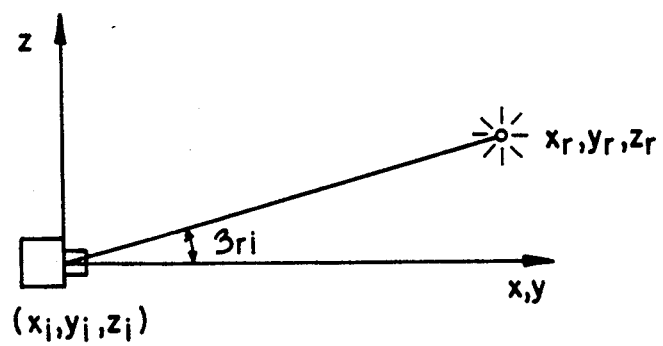
Figure 16:
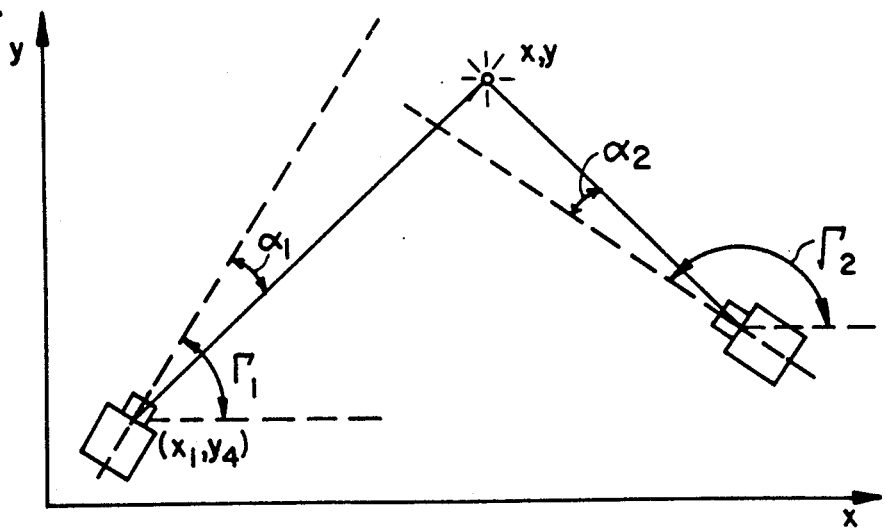
Figure 17:
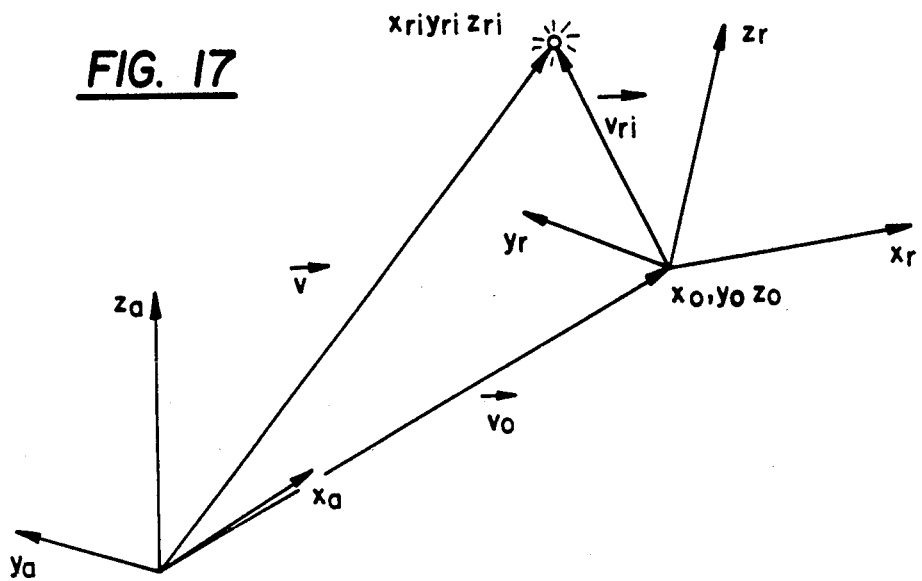
Figure 18:
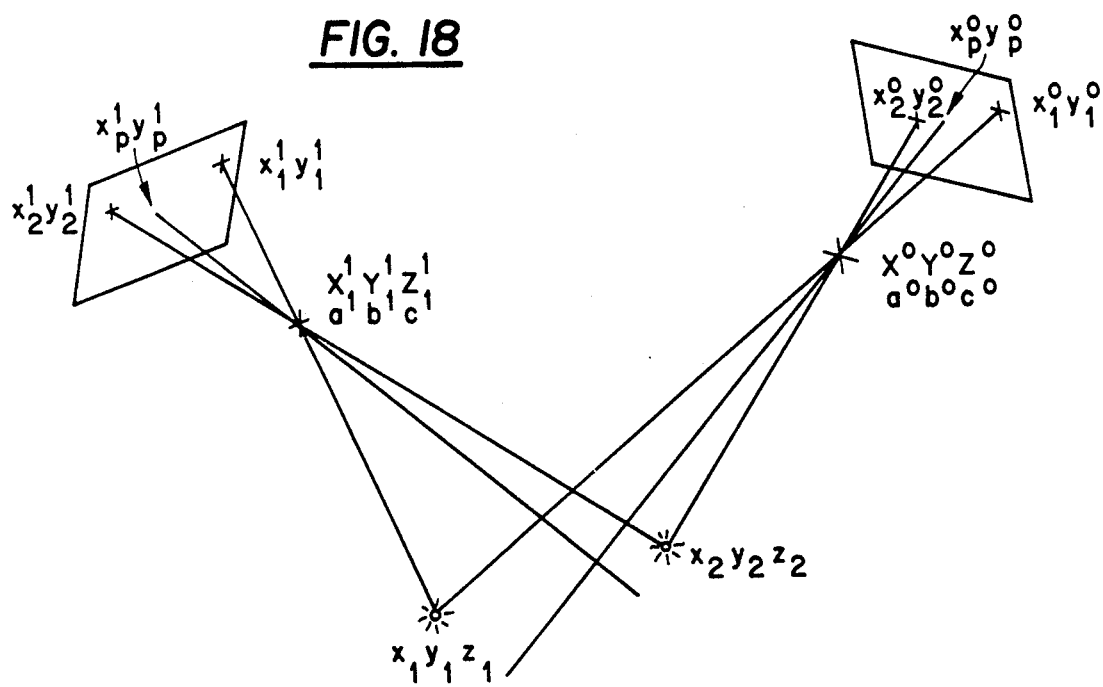

FIG. 13 illustrates the surveying of a surface using one grating 49 and a single axis rotary mirror 34 to generate a two dimensional light spot pattern (as shown in FIG. 12) by moving the line of illuminated spots 58 across the surface 36. The laser 55 and mirror 34 are controlled by a driver unit 32 connected to the data processor. The mirror is rotated stepwise, at a step length given by the pattern density requirements. A dense grid of light spots gives an accurate description of the surface geometry. The data processor may include software for intelligent scan control, e.g. to register if the laser beams actually hit the object, or to measure the sensor angle value changes to adapt the step length to the curvature of the object.

The angle sensors and the general geometry measurement systems described hereinbefore are very suitable together with this light projection technique. The geometry measurement system includes a minimum of two angle sensors, and the spatial directions of the light beams are not used in any calculations. To measure the positions of multiple light spots simultaneously, their intensity distribution should be relatively homogenous.

However, the application of this inventive light projection technique is not restricted to this type of angle sensors, implying that other angle sensors, e.g. automatic theodolites can be applied. Such theodolites are usually restricted to measure single light spots, and hence a severely increased data acquisition time would be the result.

To calculate the spatial coordinates of a point using triangulation algorithms, two spatial directions must be measured from known global positions, e.g. by using two angle sensors. The spatial directions of the diffracted beams are not sufficiently precise to be used as one of the required directions.

Even though the description above and the following claims are concentrated on the use of optical fibre gratings, the claims should be considered as including technically equivalent means, like conventional diffraction gratings and modifications of such gratings, and holographic gratings. Furthermore, where the description and patent claims describes the use of a mirror to redirect the laser beam in a scanning system, this should be considered as including technically equivalent mechanical, mechano-optical or acousto-optical means.

Various system configurations based on the present inventions have been described above. These configurations cover a variety of industrial and laboratory applications.

An example of measuring the coordinates of separate light sources is for rigging and alignment applications. Dynamic measurements can be applied to measure oscillations or vibrations of mechanical structures. As a function of optimal location of each light source, observations of their mutual movements give information on the vibrational modes of the structure.

The following list shows examples of static or dynamic measurements of the spatial position and orientation of objects:

model movements in wind tunnels or hydrodynamic laboratories, or other similar applications where high precision is required, relative positioning of two objects (docking), e.g. a robot arm and a work piece, input for guidance of automated guided vehicles in production and storage facilities.

Profile measurements are used for quality control of curved parts manufactured mainly in automotive and aerospace industry. The present use of mechanical coordinate measuring machines has certain limitations, and hence, there is a demand for accurate non-contact measurement systems. The following are the most important applications:

quality control of curved parts manufactured by the use of numerically controlled milling machines, or in a sheet metal stamping process, quality control and deformation inspections of stamping tools, digitization of surfaces, e.g. in aesthetic or aerodynamic modelling of new products, either in model or full scale.

A complete survey of the geometry of a surface is obtained using a laser scanning system that scans the entire surface. This method is very flexible, as the scanning pattern can be easily adapted to the size and shape of the surface, and the accuracy requirements.

Today, the quality control of stamped products is based on the use of mechanical templates. These are used to check the geometry of the surface at a number of critical points. To every different product, a specific template has to be manufactured. This quality check method is time consuming, thus its use is restricted to spot tests only.

A geometry measurement system based on a system for projecting multiple point sized spots as suggested above, replaces the use of these templates completely. The essential data is the deviation of the actual surface profile from nominal values in certain critical check points. The present system can handle all generated light spots simultaneously, and hence give a very fast presentation of such deviations. The nominal values are read directly from the CAD base.

One projection system including dual gratings can generate about 1000 light spots as checkpoints across a surface. The pattern density can be further increased using multiple projection systems. The survey of a surface is completed within seconds. Such a system can replace the present use of templates in automotive industry, and allow for 100% control of all manufactured parts in a serial production line. This means faster, more reliable and far more flexible solutions. A system can easily be adapted to check another product line, with a different surface curvature, as no manufacturing of new templates is required.

For some applications a single grating, generating a line of light spots across a surface, is adequate. An example is quality control of car bumper curvature.

If a very small number of check points are needed, these points can be illuminated using stationary laser sources without gratings, directed towards the surface.

Using the solutions as suggested, improved product quality is obtained, due to more frequent and reliable controls and due to the feasibility of controlling beyond the reach of existing techniques. The pay-off of the system is very good, due to its competitive price and broader applicability than existing systems.

For most applications the measurement system needs to be transported to the site of the object to be measured, e.g. in a production line or at the plant of a sub-supplier. This means that all hardware must be easily transportable, and its operation should not depend on fixed angle sensor positions. The system according to the present invention does not require a dedicated measurement laboratory. Furthermore, the system can be designed for industrial environment.

We claim:

1. An opto-electronic angle sensor measuring spatial directions towards point sized light sources or reflecting points illuminated by a light source, said sensor comprising a spherical lens and a two dimensional array of photosensitive elements, and said sensor further comprising:

means for computing a spatial direction of said light sources or illuminated points from the position of the image of said light sources or illuminated points as registered in the local coordinates of said array of photosensitive elements, said means for computing further using a two dimensional calibration table created by a single calibration that allows the angle sensor to be used in various locations without requiring any recalibration, said calibration resulting from a determination of the center of rotational symmetry of the angle sensor lens, and a determination of the relation between the spatial directions and the position of the image on the photosensitive array by the use of a high precision angle reference wherein said calibration table is obtained using light sources having a well defined and known spectral distribution; and means for performing a statistical analysis of the intensity values registered by multiple neighboring photosensitive elements wherein the resolution and accuracy of the angle measurements are increased to fractions of the size of said photosensitive elements.

2. In a method relating to an opto-electronic angle sensor for measuring spatial directions towards point sized light sources or reflecting points illuminated by a light source, said sensor comprising a spherical lens and a two-dimensional array of photosensitive elements, said method including a single calibration that allows the angle sensor to be used in various locations without requiring any recalibration, said calibration comprising the steps of:

determining the center of rotational symmetry of the angle sensor lens by the steps of:

correcting the position of an adjustable mounting fixture attached to the angle sensor to a position corresponding to the rotational axes of said sensor, the lens optical axis being defined as the x axis, the z axis of the angle sensor being defined by the vertical symmetry axis of said mounting fixture and the y axis being defined by its orthogonality to said x and z axes;

defining rotations around the z axis as horizontal angles and rotations around the y axis as vertical angles;

mounting the angle sensor onto the top of a rotary table and leveling to ensure that the optical axis is horizontal;

mounting a minimum of two light sources at approximately the same level as the optical axis such that a straight line can be drawn through the two light sources and the rotational axis of the rotary table; and adjusting the mount of the angle sensor to the rotary table until the images of the two light sources are overlapping, independent of the rotary position of the angle sensor, and clamping said mounting fixture to the angle sensor in this position;

calibrating said angle sensor for measurement of angles relative to said two rotational axes using a high precision rotary tale and a substantially vertically mounted linear device comprising light source means in the form of at least one of an array of light sources or illuminated reflecting points and an illuminated string or slit, said linear device having a length corresponding to the field of view of the angle sensor in one dimension, said calibrating step comprising the steps of:

mounting the angle sensor onto the top of said rotary table and leveling such that one of its rotational axes is exactly vertical, parallel and coincides with the rotational axis of the rotary table;

mounting said linear device parallel to said rotational axis;

step-wise rotating the angle sensor while the image of the linear device and the corresponding rotary table angle are simultaneously registered for every step to perform a determination of the relation between the angle and the position of the image on the photosensitive array;

repeating the calibrating steps for the second rotational axis of the angle sensor; and processing all registered data to establish a two-dimensional calibration table relating image coordinates to spatial directions given as horizontal and vertical angles;

wherein said calibration is based on the use of light source means having a well defined and known spectral distribution, and values of intensity registered by multiple neighboring photosensitive elements are statistically analyzed to increase the resolution and accuracy of the angle measurements to fractions of the size of said photosensitive elements.

3. In a method relating to an opto-electronic angle sensor for measuring spatial directions towards point sized light sources or reflecting points illuminated by a light source, said sensor comprising a spherical lens and a two-dimensional array of photosensitive elements, said method including a single calibration that allows the angle sensor to be used in various locations without requiring any recalibration, said calibration comprising the steps of:

determining the center of rotational symmetry of the angle sensor lens by the steps of:

correcting the position of an adjustable mounting fixture attached to the angle sensor to a position corresponding to the rotational axes of said sensor, the lens optical axis being defined as the x axis, the z axis of the angle sensor being defined by the vertical symmetry axis of said mounting fixture and the y axis being defined by its orthogonality to said x and z axes;

defining rotations around the z axis as horizontal angles and rotations around the y axis as vertical angles;

mounting the angle sensor onto the top of a rotary table and leveling to ensure that the optical axis is horizontal;

mounting a minimum of two light sources at approximately the same level as the optical axis such that a straight line can be drawn through the two light sources and the rotational axis of the rotary table; and adjusting the mount of the angle sensor to the rotary table until the images of the two light sources are overlapping, independent of the rotary position of the angle sensor, and clamping said mounting fixture to the angle sensor in this position;

calibrating said angle sensor for measurement of angles relative to said two rotational axes by the use of a substantially vertically mounted linear device comprising light source means in the form of at least one of an array of light sources or illuminated reflecting points and an illuminated string or slit, said linear device having a length corresponding to the field of view of the angle sensor in one dimension, said calibrating step comprising the steps of:

leveling the angle sensor such that one of its rotational axes is exactly vertical;

mounting said linear device parallel to said rotational axis;

step-wise moving said linear device in a known direction crossing the sensor optical axis;

registering simultaneously the horizontal position of said linear array of light sources or reflecting points and its corresponding image to determine the relation between the angle and the position of the image on the photosensitive array;

repeating the calculating step for the second rotational axis of the angle sensor; and processing all registered data to establish a two-dimensional calibration table relating image coordinates to spatial directions given as horizontal and vertical angles;

wherein said calibration is based on the use of light source means having a well defined and known spectral distribution, and values of intensity registered by multiple neighboring photosensitive elements are statistically analyzed to increase the resolution and accuracy of the angle measurements to fractions of the size of said photosensitive elements.

4. The method as claimed in claims 2 or 3 wherein:

said calibration step includes mounting said linear device such that only a small part of the vertical field of view is covered by the length of the device, and only a fraction of the field of view of the angle sensor can be calibrated having the angle sensor levelled; and the rest of the vertical field of view of the angle sensor is calibrated using a mounting fixture allowing the angle sensor to be tilted step-wise around an axis which is normal to the optical axis, so that in each tilted position a part of the photosensitive array is calibrated, and the tilt angle is measured to be used for computation of the relation between the observed image coordinates and the spatial angle.

5. A system for opto-electronic measurements of spatial coordinates of one or multiple light point sources or reflecting points illuminated by one or multiple light sources, the system comprising:

at least two angle sensors;

a plurality of dedicated image processing units, each processing unit for converting an image registered by each respective angle sensor to a two dimensional angular value corresponding to each light source or illuminated point; and a data processor for computing the coordinates of each light source or illuminated point, said data processor including means for obtaining the relations between the internal coordinate system of the individual angle sensors and the global coordinate system by one of the methods of:

leveling said angle sensors located in known positions, and calculating their orientations from the measured spatial directions to a light source or an illuminated point which is located in a known position and thereby constituting a common reference point;

said data processor calculating the positions and orientations of the angle sensors on the basis of measured directions to at least three light point sources in known global coordinates; and said data processor being capable of calculating the positions and orientations of the angle sensors on the basis of measured directions to a number of given light points, wherein the mutual separation distance is known for at least two thereof, and the position of a third point relative to said two define the orientation of the global coordinate system.

6. A system for opto-electronic measurements as claimed in claim 5 wherein each angle sensor measures spatial directions towards point sized light sources or reflecting points illuminated by a light source, each angle sensor having a spherical lens and a two dimensional array of photosensitive elements and further comprises:

means for computing a spatial direction of said light sources or illuminated points from the position of the image of said light sources or illuminated points as registered in the local coordinates of said array of photosensitive elements, said means for computing including a two dimensional calibration table that is generated by a single calibration that allows the angle sensor to be used in various locations without requiring any recalibration, said calibration resulting from a determination of the center of rotational symmetry of the angel sensor lens, and a determination of the relation between the spatial directions and the position of the image on the photosensitive array by the use of a high precision angle reference wherein said calibration table is obtained using light sources having a well defined and known spectral distribution; and means for performing a statistical analysis of the intensity values registered by multiple neighboring photosensitive elements wherein the resolution and accuracy of the angel measurements are increased to fractions of the size of said photosensitive elements.

7. A system as claimed in claim 6, wherein the light point sources are movable and the data processor comprises means for computing the dynamic behavior of the coordinates of each light source or illuminated point relative to a ground fixed coordinate system, or relative to each other.

8. A system as claimed in any one of claims 5-7, wherein:

the system further comprises a number of point sized light sources and a power supply for said light sources, at least three of said light sources being attached to each of a number of objects such that the positions of said light sources are known in object oriented local coordinate systems; and the data processor comprises means to compute the position and orientation of each object relative to a ground fixed coordinate system or relative to each other, based on the measured global coordinates of each light source.

9. A system as claimed in any one of claims 5-7, wherein:

the system comprises means to illuminate a surface point by point; and the data processor includes means to store a set of coordinates corresponding to points on a surface, and means to use these coordinates to describe the geometry of the surface.

10. A system as claimed in any one of claims 5-7, wherein:
said system comprises a number of light sources pointing in fixed directions to illuminate a corresponding number of points on an object or a surface; and
the data processor includes means to calculate the coordinates of the illuminated points and to compare them to nominal values.

11. An opto-electronic system for measuring spatial coordinates of points located on a surface, the system comprising:
means for illuminating the surface point by point and comprising a directed light source for emitting a light beam, a diffraction grating, and focusing optics to obtain a pattern of well defined discrete point sized light spots forming a curved line across the surface, wherein the system includes a minimum of two angle sensors to register the location of the projected light spots as spatial directions relative to said angle sensors; and
means for computing spatial coordinates for each discrete light spot based on registered spatial directions relative to the angle sensors.

12. An opto-electronic system for measuring spatial coordinates of points located on a surface, the system comprising:
means for illuminating the surface point by point and comprising a directed light source for emitting a light beam, two diffraction gratings, each grating dividing an incident light beam to multiple light beams and mounted together such that the longitudinal axes of the two gratings are orthogonal, and focusing optics to obtain a two-dimensional pattern of discrete point sized spots onto the surface, wherein the system includes a minimum of two angle sensors to register the location of the projected light spots as spatial directions relative to said angle sensors; and
means for computing spatial coordinates for each light spot based on registered spatial directions relative to the angle sensors.

13. An opto-electronic system for measuring spatial coordinates of points located on a surface, the system comprising:
means for illuminating the surface point by point and comprising a directed light source for emitting a light beam, a diffraction grating, and focusing optics to obtain a pattern of well defined discrete point sized light spots forming a curved line across the surface, wherein the system includes a minimum of two angle sensors to register the location of the projected light spots as spatial directions relative to said angle sensors; and
means for computing spatial coordinates for each light spot based on registered spatial directions relative to the angle sensors, wherein the system includes a single axis rotary mirror to move the line of projected light spots across the surface in a direction orthogonal to the direction of said line of light spots.

14. An opto-electronic system for measuring spatial coordinates of points located on a surface as claimed in any one of claims 11-13, wherein the system includes a data processor for describing the geometry of the surface on the basis of the measured coordinate values for a plurality of illuminated points.

15. An opto-electronic system for measuring spatial coordinates of points located on a surface as claimed in any one of claims 11-13, wherein the system includes a data processor for comparing the measured spatial coordinates of each illuminated point to nominal values.

* * * * *

UNITED STATES PATENT AND TRADEMARK OFFICE
CERTIFICATE OF CORRECTION

PATENT NO. : 5,196,900
DATED : March 23, 1993
INVENTOR(S) : PETTERSEN et al.

It is certified that error appears in the above-identified patent and that said Letters Patent is hereby corrected as shown below:

Title page, item [75], add
--Øyvind Røtvold, Hvalstad, Norway--.

On drawing sheets 16 and 17, delete Figures 14-18.

Title page, item [19], "Pettersen" should read --Pettersen, et al--

Title page, "17 Drawing Sheets" should read --15 Drawing Sheets--

Signed and Sealed this

Eighth Day of February, 1994

Attest:

BRUCE LEHMAN

Attesting Officer  Commissioner of Patents and Trademarks